(12) United States Patent
Senarath et al.

(10) Patent No.: US 11,805,075 B2
(45) Date of Patent: Oct. 31, 2023

(54) LIFECYCLE MANAGEMENT FOR NSI AND CSI

(71) Applicants: Nimal Gamini Senarath, Ottawa (CA); Chengchao Liang, Ottawa (CA); Remziye Irem Bor-Yaliniz, Ottawa (CA); Hang Zhang, Nepean (CA)

(72) Inventors: Nimal Gamini Senarath, Ottawa (CA); Chengchao Liang, Ottawa (CA); Remziye Irem Bor-Yaliniz, Ottawa (CA); Hang Zhang, Nepean (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 65 days.

(21) Appl. No.: 16/058,695

(22) Filed: Aug. 8, 2018

(65) Prior Publication Data

US 2019/0052579 A1    Feb. 14, 2019

Related U.S. Application Data

(60) Provisional application No. 62/544,659, filed on Aug. 11, 2017.

(51) Int. Cl.
*H04L 47/70* (2022.01)
*H04L 41/0816* (2022.01)
(Continued)

(52) U.S. Cl.
CPC .......... *H04L 47/82* (2013.01); *H04L 41/0806* (2013.01); *H04L 41/0816* (2013.01); *H04L 41/5048* (2013.01)

(58) Field of Classification Search
None
See application file for complete search history.

(56) References Cited

U.S. PATENT DOCUMENTS

| | | | | |
|---|---|---|---|---|
| 2014/0079207 A1* | 3/2014 | Zhakov | ................. | H04M 3/523 379/265.03 |
| 2015/0363238 A1 | 12/2015 | Bai et al. | | |

(Continued)

FOREIGN PATENT DOCUMENTS

CN    102118861 A    7/2011

OTHER PUBLICATIONS

DeFoy et al. "Network Slicing—3GPP Use Case, Draft 1", IETF Draft, Apr. 26, 2017 [retrieved on Mar. 12, 2020], Retrieved from the Internet: <URL: https://tools.ietf.org/pdf/draft-defoy-netslices-3gpp-network-slicing-01.pdf>. (Year: 2017).*

(Continued)

*Primary Examiner* — Kevin T Bates
*Assistant Examiner* — Dae Kim

(57) ABSTRACT

A network management entity configured to: deactivate a Network Slice Instance without releasing network resources previously allocated to the Network Slice Instance; and subsequent to deactivating the Network Slice Instance, activating the Network Slice Instance using the network resources previously allocated to the Network Slice Instance. A Network Slice Management Function (NSMF) perform slice specific Lifecycle Management (LCM) for a Network Slice Instance (NSI) based on Communication Service Instance (CSI) requirements is also disclosed. Customer Service Management Function (CSMF) for receiving service requirements from a Service Manager (SM) and transmitting the CSI requirements a Network Slice Management Function (NSMF) is also disclosed.

10 Claims, 18 Drawing Sheets

(51) Int. Cl.
*H04L 41/5041* (2022.01)
*H04L 41/0806* (2022.01)

(56) References Cited

U.S. PATENT DOCUMENTS

| | | | | |
|---|---|---|---|---|
| 2016/0156513 | A1* | 6/2016 | Zhang | H04L 67/10 709/220 |
| 2016/0353465 | A1* | 12/2016 | Vrzic | H04W 28/0247 |
| 2017/0086118 | A1* | 3/2017 | Vrzic | H04W 36/26 |
| 2017/0141973 | A1* | 5/2017 | Vrzic | H04L 41/5051 |
| 2017/0289791 | A1* | 10/2017 | Yoo | H04W 68/005 |
| 2017/0357528 | A1* | 12/2017 | Puranik | H04L 67/10 |
| 2018/0176306 | A1* | 6/2018 | Kahn | H04L 12/4641 |
| 2018/0332441 | A1* | 11/2018 | Shaw | H04L 41/0893 |
| 2018/0359337 | A1* | 12/2018 | Kodaypak | H04L 41/0896 |
| 2019/0104455 | A1* | 4/2019 | Park | H04W 76/20 |
| 2019/0223093 | A1* | 7/2019 | Watfa | H04W 36/06 |

OTHER PUBLICATIONS

Galis. "Network Slicing Terms and Systems", IETF website, Jul. 12, 2017 [retrieved on Mar. 14, 2020], Retrieved from the Internet: <URL: https://www.ietf.org/proceedings/99/slides/slides-99-netslicing-alex-galis-netslicing-terms-and-systems-01.pdf>. (Year: 2017).*

"Network Functions Virtualisation (NFV); Management and Orchestration Disclaimer"; the Network Functions Virtualisation (NFV) ETSI Industry Specification Group (ISG); ETSI GS NFV-MAN 001 V1.1.1 (Dec. 2014).

"3rd Generation Partnership Project; Technical Specification Group Services and System Aspects; Telecommunication management; Management of network slicing in mobile networks; Concepts, use cases and requirements (Release 15)"; 3GPP TS 28.530 V0.0.0 (Jun. 2017).

"3rd Generation Partnership Project; Technical Specification Group Services and System Aspects; Telecommunication management; Study on management and orchestration of network slicing for next generation network (Release 15)" 3GPP TR 28.801 V1.2.0 (May 2017).

Interdigital Inc S Ku: "Network Slicing Architecture;draft-geng-netslices architecture 01"; Network Slicing Architecture; Jun. 2, 2017 (Jun. 2, 2017), pp. 1-27, XP015119930.

3GPP TR 28.801 V15.1.0 (Jan. 2018), 3rd Generation Partnership Project; Technical Specification Group Services and System Aspects; Telecommunication management; Study on management and orchestration of network slicing for next generation network (Release 15), 75 pages.

* cited by examiner

LIFECYCLE MANAGEMENT FOR NSI AND CSI

CROSS-REFERENCE TO RELATED APPLICATIONS

This application claims the benefit of priority to U.S. Provisional Patent Application U.S. Patent Application Ser. No. 62/544,659 entitled "Lifecycle Management for NSI and CSI" filed Aug. 11, 2017 the contents of which are hereby incorporated by reference in their entirety.

FIELD OF THE INVENTION

The present invention pertains to the field of communications networks, and in particular to Lifecycle Management for Network Slice Instances (NSIs) and Communication Service Instances (CSIs).

SUMMARY

An object of embodiments of the present invention is to provide techniques for independently managing provisioning, activation, deactivation and termination of NSIs and CSIs.

An aspect of the present invention provides a network management entity configured to deactivate a Network Slice Instance without releasing network resources previously allocated to the Network Slice Instance. The network management entity is also configured to activate the Network Slice Instance using the network resources previously allocated to the Network Slice Instance subsequent to deactivating the Network Slice Instance. Optionally, the processor is further configured to activate the NSI based on a trigger associated with a communication service. Optionally, the processor is further configured to modify the activated NSI based on one of a network slice requirement and a trigger associated with a communication service. Another aspect of the present invention provides a method including steps performed by the network management entity above.

A further aspect of this disclosure provides a network slice function, such as a network slice management function (NSMF) for managing the operation of network slice instances to which a first communication service instance is deployed. Such a network slice function can be instantiated in a network element. The NSMF is configured to receive an indication of a triggering event relating to an additional communication service instance. The NSMF is also configured to modify the network slice instance in response to the received triggering event. In some embodiments the NSMF is configured to receive an indication of a triggering event relating to deactivation of a network slice instance and deactivating the network slice instance without releasing all network resources previously allocated to the network slice instance so as to maintain the network slice instance in an inactive state for future use. In some embodiments the NSMF is configured to implement a network slice instance (NSI) lifecycle including a provisioning stage, a run-time stage, and a decommissioning stage. The decommissioning stage in this embodiment includes deactivation and termination stages. In some such embodiments, deactivating the network slice instance without releasing all network resources previously allocated to the network slice instance to maintain the network slice instance in an inactive state for future use includes monitoring for further trigger events. The further triggering events can include a return to the provisioning stage or returning to the run-time stage for modification of the network slice instance based on service updates. In some other embodiments, the run-time stage in this embodiment includes a modification stage, an activation stage, and a deactivation stage, and the decommissioning stage includes a termination stage. The NSMF of such other embodiments, when deactivating the network slice instance without releasing all network resources previously allocated to the network slice instance to maintain the network slice instance in an inactive state for future use includes monitoring for further trigger events which include either reactivating the network slice instance or modifying the network slice instance based on service updates. In some embodiments, modifying the network slice instance includes changing the capability. In some embodiments, modifying the network slice instance further includes changing capacity. In some embodiments, modification of the NSI causes modification of the communication service instance. In some embodiments, modification of the network slice instance causes modification of the communication service instance. In some embodiments, modification of the network slice instance is triggered by a modification of the communication service instance. In some embodiments the communication service instance is deployed to a plurality of network slice instances.

A further aspect of this disclosure provides a network function, such as a Customer Service Management Function (CSMF) for managing the operation of a communication service instance. The CSMF is configured to receive service requirements for a service manager. The CSMF is also configured to transmit the communication service instance requirements to a Network Slice Management Function (NSMF). In some embodiments transmitting communication service instance requirements causes modification of selected existing network slice instances in accordance with received communication service instance requirements. In some embodiments, transmitting communication service instance requirements causes provisioning of a new network slice instance in accordance with the received communication service instance requirements. In some embodiments, the CSMF selects suitable existing network slice instances for modification in accordance with communication service instance requirements. In some embodiments, the CSMF deploys a plurality of communication service instances to the selected network slice instance. In some embodiments the CSMF deploys a single communication service instance to a plurality of network slice instances.

A further aspect of the disclosure provides a method for managing network slices. The method is executed by a Customer Service Management Function (CSMF), which can be instantiated in a network element. The steps of the method include receiving service requirements for a service manager, and transmitting the communication service instance requirements to a Network Slice Management Function (NSMF). In some embodiments the method further includes converting the received service requirements into a communications service instance specification which includes network requirements and Communication Service Instance (CSI) requirements. In some such embodiments transmitting the CSI requirements to a Network Slice Management Function (NSMF) includes transmitting the communications service instance specification to the NSMF. In some embodiments the NSMF is configured to perform slice specific lifecycle management for a network slice instance based on communication service instance requirements.

A further aspect of the disclosure provides a method of controlling a Network Slice Instance (NSI) to which a first Communication Service Instance (CSI) is deployed, the method executed by a Network Slice Management Function (NSMF). Such a method includes receiving an indication of a triggering event relating to an additional CSI and modifying the NSI in response to the received triggering event. In some embodiments, the method includes receiving an indication of a triggering event related to deactivating the network slice instance and deactivating the NSI without releasing all network resources previously allocated to the NSI so as to maintain the NSI in an inactive state for future use. In some embodiments the method includes executing a network slice instance lifecycle including a provisioning stage, a run-time stage, and a decommissioning stage. In some such embodiments the decommissioning stage includes deactivation and termination stages. In some such embodiments, the method of deactivating the network slice instance without releasing all network resources previously allocated to the network slice instance to maintain the network slice instance in an inactive state for future use includes monitoring for further trigging events. The further triggering events can include a return to the provisioning stage or returning to run-time stage for modification of the network slice instance based on service updates. In some embodiments, the method includes executing an NSI lifecycle including a provisioning stage; a run-time stage including a modification stage, an activation stage, and a deactivation stage; and a decommissioning stage including a termination stage. In some such embodiments deactivating the NSI without releasing all network resources previously allocated to the NSI so as to maintain the NSI in an inactive state for future use includes monitoring for further trigger events. In such embodiments, the further trigger events includes reactivating the NSI and modifying the NSI based on service updates.

BRIEF DESCRIPTION OF THE FIGURES

Further features and advantages of the present invention will become apparent from the following detailed description, taken in combination with the appended drawings, in which.

It will be noted that throughout the appended drawings, like features are identified by like reference numerals.

DETAILED DESCRIPTION

In the following description, features of the present invention are described by way of example embodiments. For convenience of description, these embodiments make use of features and terminology known from 4G and 5G networks as defined by the Third Generation Partnership Project (3GPP). However, it shall be understood that the present invention is not limited to such networks. Rather, methods and systems in accordance with the present invention may be implemented in any network in which a mobile device may connect to the network through at least one access point, and subsequently be handed-over to at least one other access point during the course of a communications session.

Figure 1:
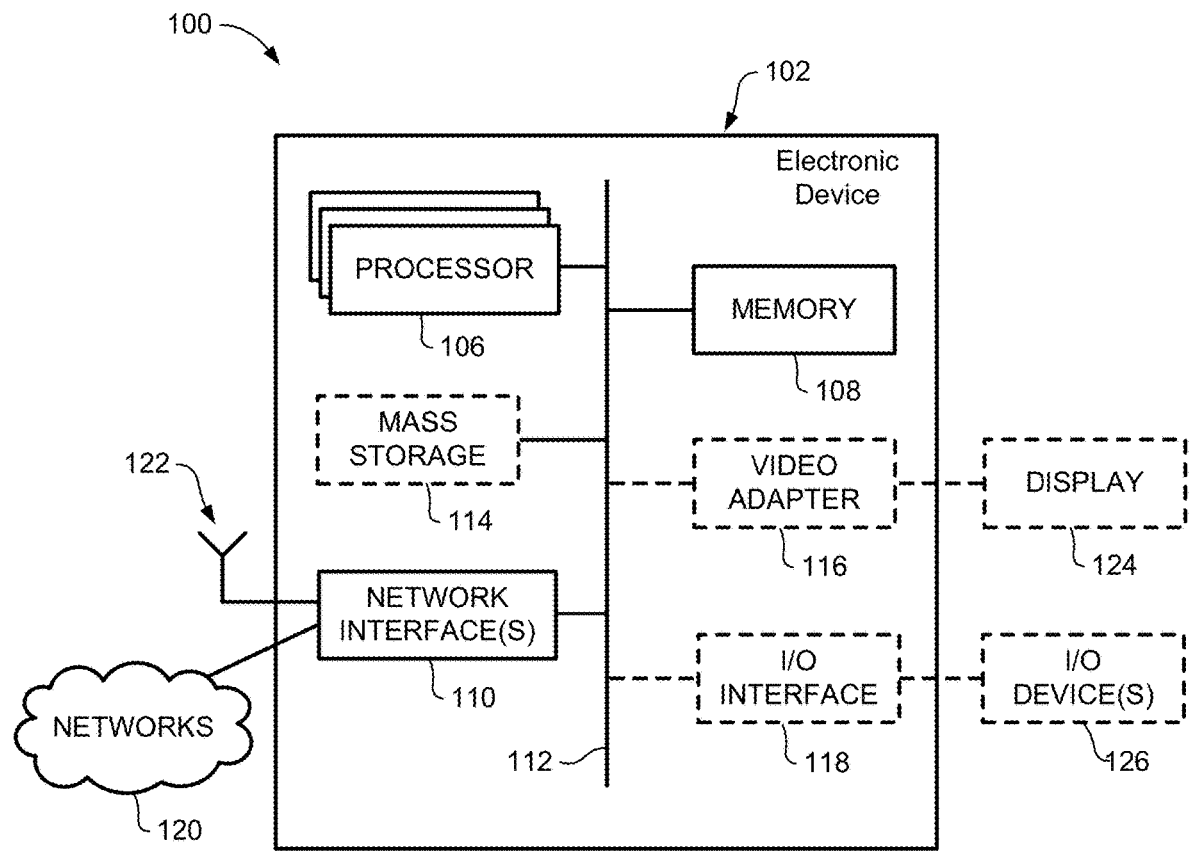
FIG. 1 is a block diagram of an electronic device within a computing and communications environment that may be used for implementing devices and methods in accordance with representative embodiments of the present invention.

FIG. 1 is a block diagram of an electronic device (ED) 102 illustrated within a computing and communications environment 100 that may be used for implementing the devices and methods disclosed herein. In some embodiments, the electronic device 102 may be an element of communications network infrastructure, such as a base station (for example a NodeB, an enhanced Node B (eNodeB), a next generation NodeB (sometimes referred to as a gNodeB or gNB), a home subscriber server (HSS), a gateway (GW) such as a packet gateway (PGW) or a serving gateway (SGW) or various other nodes or functions within an evolved packet core (EPC) network. In other embodiments, the electronic device 2 may be a device that connects to network infrastructure over a radio interface, such as a mobile phone, smart phone or other such device that may be classified as a User Equipment (UE). In some embodiments, ED 102 may be a Machine Type Communications (MTC) device (also referred to as a machine-to-machine (m2m) device), or another such device that may be categorized as a UE despite not providing a direct service to a user. In some references, an ED 102 may also be referred to as a mobile device (MD), a term intended to reflect devices that connect to mobile network, regardless of whether the device itself is designed for, or capable of, mobility. Specific devices may utilize all of the components shown or only a subset of the components, and levels of integration may vary from device to device. Furthermore, a device may contain multiple instances of a component, such as multiple processors, memories, transmitters, receivers, etc. The electronic device 102 typically includes a processor 106, such as a Central Processing Unit (CPU), and may further include specialized processors such as a Graphics Processing Unit (GPU) or other such processor, a memory 108, a network interface 110 and a bus 112 to connect the components of ED 102. ED 102 may optionally also include components such as a mass storage device 114, a video adapter 116, and an I/O interface 118 (shown in dashed lines).

The memory 108 may comprise any type of non-transitory system memory, readable by the processor 106, such as static random-access memory (SRAM), dynamic random access memory (DRAM), synchronous DRAM (SDRAM), read-only memory (ROM), or a combination thereof. In specific embodiments, the memory 108 may include more than one type of memory, such as ROM for use at boot-up, and DRAM for program and data storage for use while executing programs. The bus 112 may be one or more of any type of several bus architectures including a memory bus or memory controller, a peripheral bus, or a video bus.

The electronic device 102 may also include one or more network interfaces 110, which may include at least one of a wired network interface and a wireless network interface. As illustrated in FIG. 1, network interface 110 may include a wired network interface to connect to a network 120, and also may include a radio access network interface 122 for connecting to other devices over a radio link. When ED 102 is network infrastructure, the radio access network interface 122 may be omitted for nodes or functions acting as elements of the Core Network (CN) other than those at the radio edge (e.g. an eNB). When ED 102 is infrastructure at the radio edge of a network, both wired and wireless network interfaces may be included. When ED 102 is a wirelessly connected device, such as a User Equipment, radio access network interface 122 may be present and it may be supplemented by other wireless interfaces such as WiFi network interfaces. The network interfaces 110 allow the electronic device 102 to communicate with remote entities such as those connected to network 120.

The mass storage 114 may comprise any type of non-transitory storage device configured to store data, programs, and other information and to make the data, programs, and other information accessible via the bus 112. The mass storage 114 may comprise, for example, one or more of a solid-state drive, hard disk drive, a magnetic disk drive, or an optical disk drive. In some embodiments, mass storage 114 may be remote to the electronic device 102 and accessible through use of a network interface such as interface 110. In the illustrated embodiment, mass storage 114 is distinct from memory 108 where it is included, and may generally perform storage tasks compatible with higher latency, but may generally provide lesser or no volatility. In some embodiments, mass storage 114 may be integrated with a memory 108 to form an heterogeneous memory.

The optional video adapter 116 and the I/O interface 118 (shown in dashed lines) provide interfaces to couple the electronic device 102 to external input and output devices. Examples of input and output devices include a display 124 coupled to the video adapter 116 and an I/O device 126 such as a touch-screen coupled to the I/O interface 118. Other devices may be coupled to the electronic device 102, and additional or fewer interfaces may be utilized. For example, a serial interface such as Universal Serial Bus (USB) (not shown) may be used to provide an interface for an external device. Those skilled in the art will appreciate that in embodiments in which ED 102 is part of a data center, I/O interface 118 and Video Adapter 116 may be virtualized and provided through network interface 110.

In some embodiments, electronic device 102 may be a standalone device, while in other embodiments electronic device 102 may be resident within a data center. A data center, as will be understood in the art, is a collection of computing resources (typically in the form of servers) that can be used as a collective computing and storage resource. Within a data center, a plurality of servers can be connected together to provide a computing resource pool upon which virtualized entities can be instantiated. Data centers can be interconnected with each other to form networks consisting of pools computing and storage resources connected to each by connectivity resources. The connectivity resources may take the form of physical connections such as Ethernet or optical communications links, and may include wireless communication channels as well. If two different data centers are connected by a plurality of different communication channels, the links can be combined together using any of a number of techniques including the formation of link aggregation groups (LAGs). It should be understood that any or all of the computing, storage and connectivity resources (along with other resources within the network) can be divided between different sub-networks, in some cases in the form of a resource slice. If the resources across a number of connected data centers or other collection of nodes are sliced, different network slices can be created.

Figure 2:
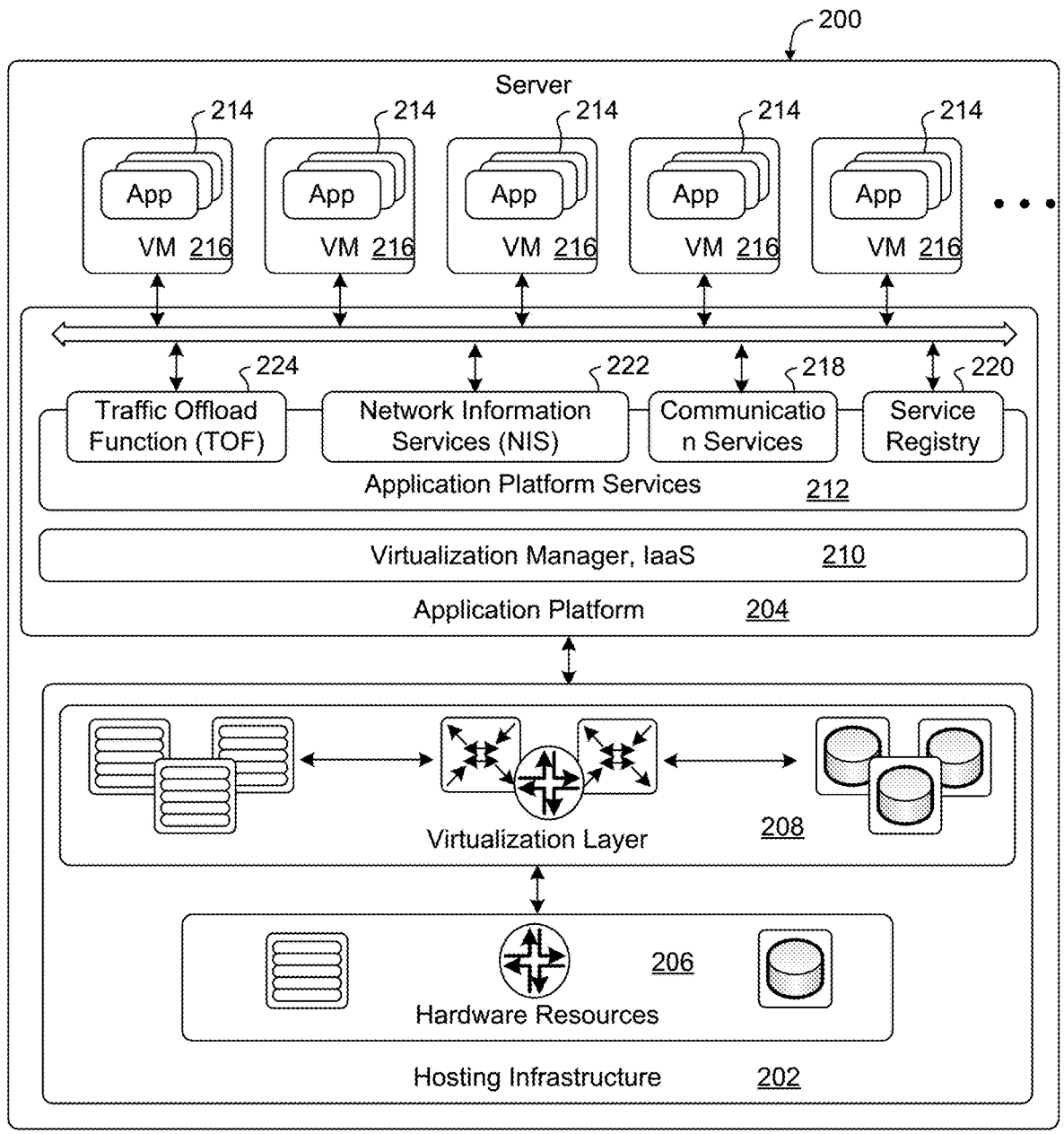
FIG. 2 is a block diagram illustrating a logical platform under which an Electronic Device can provide virtualization services.

FIG. 2 is a block diagram schematically illustrating an architecture of a representative server 200 usable in embodiments of the present invention. It is contemplated that the server 200 may be physically implemented as one or more computers, storage devices and routers (any or all of which may be constructed in accordance with the system 100 described above with reference to FIG. 1) interconnected together to form a local network or cluster, and executing suitable software to perform its intended functions. Those of ordinary skill will recognize that there are many suitable combinations of hardware and software that may be used for the purposes of the present invention, which are either known in the art or may be developed in the future. For this reason, a figure showing the physical server hardware is not included in this specification. Rather, the block diagram of FIG. 2 shows a representative functional architecture of a server 200, it being understood that this functional architecture may be implemented using any suitable combination of hardware and software. It will also be understood that server 200 may itself be a virtualized entity. Because a virtualized entity has the same properties as a physical entity from the perspective of another node, both virtualized and physical computing platforms may serve as the underlying resource upon which virtualized functions are instantiated.

As may be seen in FIG. 2, the illustrated server 200 generally comprises a hosting infrastructure 202 and an application platform 204. The hosting infrastructure 202 comprises the physical hardware resources 206 (such as, for example, information processing, traffic forwarding and data storage resources) of the server 200, and a virtualization layer 208 that presents an abstraction of the hardware resources 206 to the Application Platform 204. The specific details of this abstraction will depend on the requirements of the applications being hosted by the Application layer (described below). Thus, for example, an application that provides traffic forwarding functions may be presented with an abstraction of the hardware resources 206 that simplifies the implementation of traffic forwarding policies in one or more routers. Similarly, an application that provides data storage functions may be presented with an abstraction of the hardware resources 206 that facilitates the storage and retrieval of data (for example using Lightweight Directory Access Protocol—LDAP). The virtualization layer 208 and the application platform 204 may be collectively referred to as a Hypervisor.

The application platform 204 provides the capabilities for hosting applications and includes a virtualization manager 210 and application platform services 212. The virtualization manager 210 supports a flexible and efficient multi-tenancy run-time and hosting environment for applications 214 by providing Infrastructure as a Service (IaaS) facilities. In operation, the virtualization manager 210 may provide a security and resource "sandbox" for each application being hosted by the platform 204. Each "sandbox" may be implemented as a Virtual Machine (VM) 216 that may include an appropriate operating system and controlled access to (virtualized) hardware resources 206 of the server 200. The application-platform services 212 provide a set of middleware application services and infrastructure services to the applications 214 hosted on the application platform 204, as will be described in greater detail below.

Applications 214 from vendors, service providers, and third-parties may be deployed and executed within a respective Virtual Machine 216. For example, MANagement and Orchestration (MANO) functions and Service Oriented Network Auto-Creation (SONAC) functions (or any of Software Defined Networking (SDN), Software Defined Topology (SDT), Software Defined Protocol (SDP) and Software Defined Resource Allocation (SDRA) controllers that may in some embodiments be incorporated into a SONAC controller) may be implemented by means of one or more applications 214 hosted on the application platform 204 as described above. Communication between applications 214 and services in the server 200 may conveniently be designed according to the principles of Service-Oriented Architecture (SOA) known in the art.

Communication services 218 may allow applications 214 hosted on a single server 200 to communicate with the application-platform services 212 (through pre-defined Application Programming Interfaces (APIs) for example) and with each other (for example through a service-specific API).

A service registry 220 may provide visibility of the services available on the server 200. In addition, the service registry 220 may present service availability (e.g. status of the service) together with the related interfaces and versions. This may be used by applications 214 to discover and locate the end-points for the services they require, and to publish their own service end-point for other applications to use.

Mobile-edge Computing allows cloud application services to be hosted alongside virtualized mobile network elements in data centers that are used for supporting the processing requirements of the Cloud-Radio Access Network (C-RAN). For example, eNodeB or gNB nodes may be virtualized as applications 214 executing in a VM 216. Network Information Services (NIS) 222 may provide applications 214 with low-level network information. For example, the information provided by MS 222 may be used by an application 214 to calculate and present high-level and meaningful data such as: cell-ID, location of the subscriber, cell load and throughput guidance.

A Traffic Off-Load Function (TOF) service 224 may prioritize traffic, and route selected, policy-based, user-data streams to and from applications 214. The TOF service 224 may be supplied to applications 214 in various ways, including: A Pass-through mode where (either or both of uplink and downlink) traffic is passed to an application 214 which can monitor, modify or shape it and then send it back to the original Packet Data Network (PDN) connection (e.g. 3GPP bearer); and an End-point mode where the traffic is terminated by the application 214 which acts as a server.

As may be appreciated, the server architecture of FIG. 2 is an example of Platform Virtualization, in which each Virtual Machine 216 emulates a physical computer with its own operating system, and (virtualized) hardware resources of its host system. Software applications 214 executed on a virtual machine 216 are separated from the underlying hardware resources 206 (for example by the virtualization layer 208 and Application Platform 204). In general terms, a Virtual Machine 216 is instantiated as a client of a hypervisor (such as the virtualization layer 208 and application-platform 204) which presents an abstraction of the hardware resources 206 to the Virtual Machine 216.

Other virtualization technologies are known or may be developed in the future that may use a different functional architecture of the server 200. For example, Operating-System-Level virtualization is a virtualization technology in which the kernel of an operating system allows the existence of multiple isolated user-space instances, instead of just one. Such instances, which are sometimes called containers, virtualization engines (VEs) or jails (such as a "FreeBSD jail" or "chroot jail"), may emulate physical computers from the point of view of applications running in them. However, unlike virtual machines, each user space instance may directly access the hardware resources 206 of the host system, using the host systems kernel. In this arrangement, at least the virtualization layer 208 of FIG. 2 would not be needed by a user space instance. More broadly, it will be recognised that the functional architecture of a server 200 may vary depending on the choice of virtualisation technology and possibly different vendors of a specific virtualisation technology.

Figure 3A:
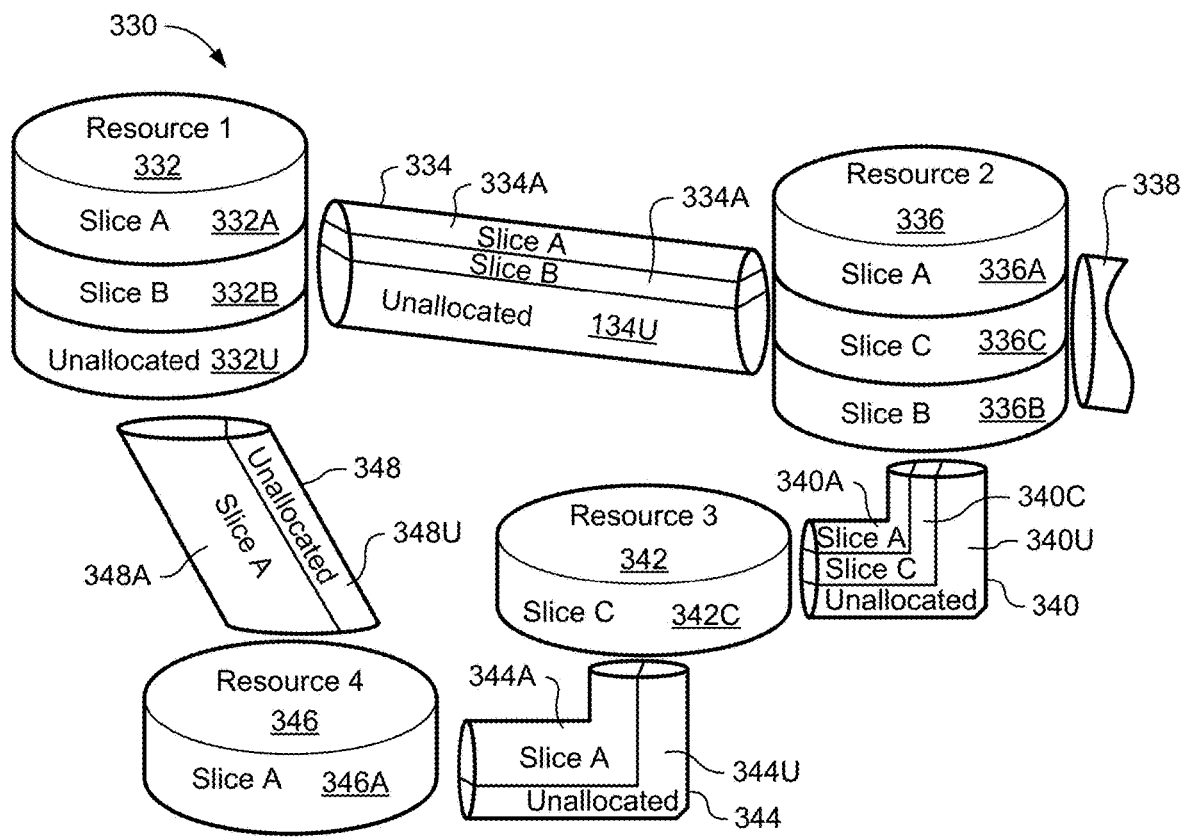
FIG. 3A is a block diagram schematically illustrating an example architecture in which network slicing can be implemented.

FIG. 3A illustrates an architecture 330 that connects a plurality of connectivity, compute and storage resources, and supports network slicing. In the following, resources are connected to other discrete resources through Connectivity Resources 334, 338, 340, 344 and 348. It will be understood that as network functions are instantiated within resources, they may be connected to each other by virtual connections that in some embodiments do not rely upon the physical connectivity resources illustrated, but instead may be connected to each other by virtual connections, which will also be considered as connectivity resources. Resource 1 332 is connected to Resource 2 336 by Connectivity Resource 334. Resource 2 336 is connected to unillustrated resources through Connectivity Resource 338, and is also connected to Resource 3 342 by Connectivity Resource 340. Resource 4 346 is connected to Resource 3 342 through Connectivity Resource 344, and to Resource 1 332 by Connectivity Resource 348. Resource 1 332, Resource 2 336, Resource 3 342 and Resource 4 346 should be understood as representing both compute and storage resources, although specialized functions may also be included. In some embodiments a specialized network function may be represented by any or all of Resource 1 332, Resource 2 336, Resource 3 342 and Resource 4 346, in which case, it may be the capability or capacity of the network function that is being sliced. Connectivity Resources 334, 338, 340, 344 and 1348 may be considered, for the following discussions, as logical links between two points (e.g. between two data centers) and may be based on set of physical connections.

Resource 1 332 is partitioned to allocate resources to Slice A 332A, and Slice B 332B. A portion 332U of the resources available to Resource 1 332 remains unallocated. Those skilled in the art will appreciate that upon allocation of the network resources to different slices, the allocated resources are isolated from each other. This isolation, both in the compute and storage resources, ensures that processes in one slice do not interact or interfere with the processes and functions of the other slices. This isolation can be extended to the connectivity resources as well. Connectivity Resource 334 is partitioned to provide connectivity to Slice A 334A and Slice B 334B, and also retains some unallocated bandwidth 334U. It should be understood that in any resource that either has unallocated resources or that has been partitioned to support a plurality of resources, the amount of the resource (e.g. the allocated bandwidth, memory, or number of processor cycles) can be varied or adjusted to allow changes to the capacity of each slice. In some embodiments, slices are able to support "breathing", which allows the resources allocated to the slice to increase and decrease along with any of the available resources, the required resources, an anticipated resource need, or other such factors, alone or in combination with each other. In some embodiments the allocation of resources may be in the form of soft slices in which a fixed allocation is not committed and instead the amount of the resource provided may be flexible. In some embodiments, a soft allocation may allocate a percentage the resource to be provided over a given time window, for example 50% of the bandwidth of a connection over a time window. This may be accompanied by a minimum guaranteed allocation. Receiving a guarantee of 50% of the capacity of a connectivity resource at all times may provide very different service characteristics than receiving 50% of the capacity of the connectivity resource over a ten second window.

Resource 2 336 is partitioned to support allocations of the available compute and storage resources to Slice A 336A, Slice C 336C and Slice B 336B. Because there is no allocation of resources in connectivity resource 334 to Slice C, Resource 2 336 may, in some embodiments, not provide a network interface to Slice C 336C to interact with connectivity resource 334. Resource 2 336 can provide an interface to different slices to Connectivity Resource 338 in accordance with the slices supported by Connectivity Resource 338. Connectivity Resource 340 is allocated to Slice A 340A and Slice C 340C with some unallocated capacity 340U. Connectivity Resource 340 connects Resource 2 336 with Resource 3 342.

Resource 3 342 provides compute and storage resources that are allocated exclusively to Slice C 342C, and is also connected to Connectivity Resource 344 which in addition to the unallocated portion 344U includes an allocation of Connectivity Resource 344A to slice A. It should be noted that from the perspective of functions or processes within Slice A, Resource 3 342 may not be visible. Connectivity Resource 344 provides a connection between Resource 3 342 and Resource 4 346, whose resources are allocated entirely to Slice A 346A. Resource 4 346 is connected to Resource 1 332 by Connectivity Resource 348, which has a portion of the connection allocated to Slice A 348A, while the balance of the resources 348U are unallocated.

Figure 3B:
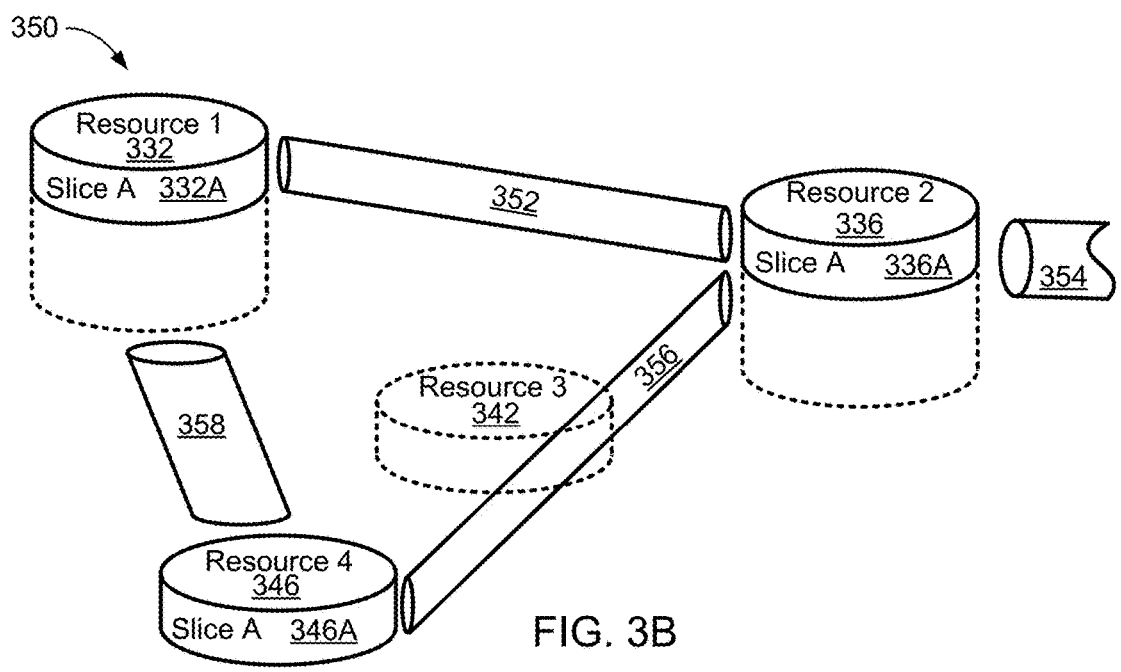
FIG. 3B is a block diagram illustrating the architecture discussed in FIG. 3A from the perspective of a single slice.

FIG. 3B illustrates the view of the architecture 336 of FIG. 3A as would be seen from the perspective of Slice A. This may be understood as a view of the resources allocated to Slice A 350 across the illustrated network segment. From within Slice A 350, only the portions of the resources that have been allocated to Slice A 350 are visible. Thus, instead of being able to see the full capacity and capability of Resource 1 332, the capabilities and capacity of the portion allocated to Slice A 332A is available. Similarly, instead of being able to see the capacity and capabilities of Resource 2 336, only the capabilities and capacity of the portion allocated to Slice A 336A are available. Because nothing from Resource 3 342 had been allocated to Slice A 350, Resource 3 342 is not present within the topology of Slice A 350. All of the capacity and capability of Resource 4 346 was allocated to Slice A 346, and as such is present within Slice A 350. Slice A 332A of Resource 1 332 is connected to Slice A 336A of Resource 2 336 by logical link 352. Logical Link 352 may correspond to the portion of connectivity resource 334 allocated to Slice A 334A. Slice A 336A is connected to logical link 354 (representative of the portion of connectivity resource 338 allocated to Slice A 350), and is connected to Slice A 346A by logical link 356. Logical link 356 is representative of the portions of connectivity resource 340 and connectivity resource 344 that have been allocated to Slice A (portions 340A and 344A respectively). It should be understood that due to the absence of Resource 3 342 from Slice A 150, any traffic transmitted by Slice A 336A onto Connectivity Resource 340A will be delivered to Resource 4 346, and similarly any traffic transmitted from Slice 346A into Connectivity Resource 344A will be delivered to Slice A 336A. As such, within Slice A 350, Connectivity Resources 340A and 344A can be modelled as a single logical link 356. Logical link 358 is representative of the portion of Connectivity Resource 348 allocated to slice A 348A.

It should be understood that within the storage and compute resources illustrated in FIGS. 3A and 3B, network functions can be instantiated using any of a number of known techniques, including network function virtualization (NFV), to create Virtual Network Functions (VNFs). While conventional telecommunications networks, including so-called Third Generation and Fourth Generation (3G/4G) networks, can be implemented using virtualized functions in their core networks, next generation networks, including so-called Fifth Generation (5G) networks, are expected to use NFV and other related technologies as fundamental building blocks in the design of a new Core Network (CN) and Radio Access Network (RAN). By using NFV, and technologies such as Software Defined Networking (SDN), functions in a CN can be instantiated at a location in the network that is determined based on the needs of the network. It should be understood that if a network slice is created, the allocation of resources at different data centers allows for the instantiation of a function at or near a particular geographic location, even within the slice where resources have been abstracted. This allows virtualized functions to be "close" in a physical sense to the location at which they are used. This may be useful, and may be combined with a sense of topological closeness to select a logical location at which to instantiate a function so that it is geographically or topologically close to a selected physical or network location.

Figure 4:
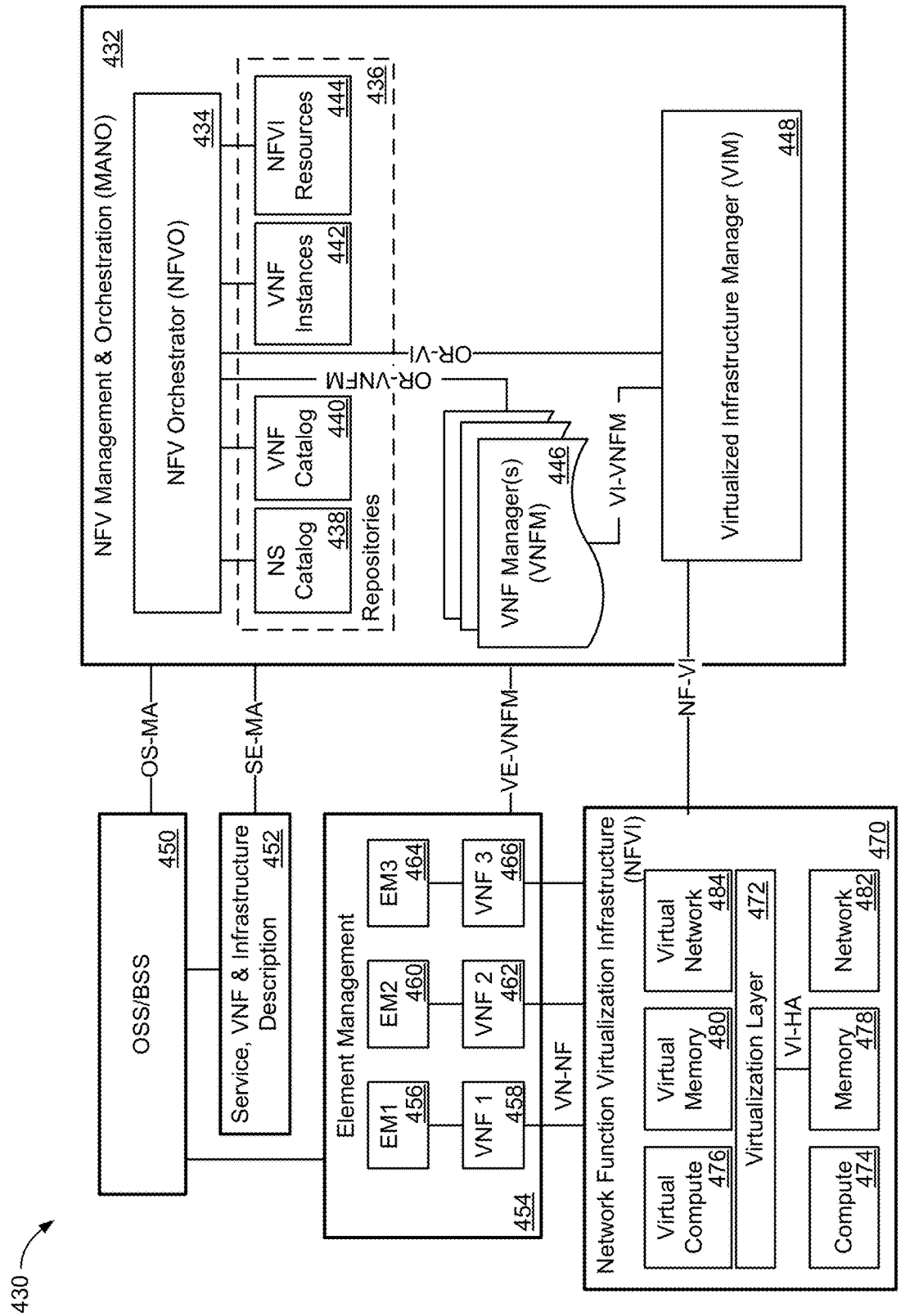
FIG. 4 is a block diagram illustrating an example ETSI NFV MANO compliant management and orchestration service.

The European Telecommunications Standards Institute (ETSI) has developed a set of standards for Network Function Virtualization (NFV) MANagement and Orchestration (MANO). As illustrated in FIG. 4, the NFV-MANO system allows for the management of NFV instantiation and modification. As illustrated, there can be interfaces to existing systems such as the OSS/BSS. In network architecture 430, an NFV-MANO system 432 includes an orchestrator 434 which can access libraries 436 such as Network Service catalog 438, VNF Catalog 440, VNF Instances repository 442 and NFVI resources repository 444. The NS Catalog 438 may include templates which can be used as the basis for supporting network services. VNF catalog 440 may contain templates for the instantiation of different classes of VNFs. A particular VNF, after being instantiated, may be referred to as a VNF instance, and its attributes may be stored in VNF instances repository 442. NFVI resources 444 may be used to track the availability of resources, including both virtual resources and the physical infrastructure upon which they are instantiated. The NFVO 434 can be connected to a number of VNF Managers 446 through an OR-VNFM interface, and to a Virtualized Infrastructure Manager (VIM) 448 through a OR-VI interface. The VNFM 446 and VIM 448 can be connected to each other through a Vi-VNFM interface.

The NFV MANO 432 can communicate with an OSS/BSS system 450 through OS-MA interface, and to a Service, VNF & Infrastructure description database 452 though an SE-MA interface. The Service, VNF & Infrastructure description database 452 can contain operator information about the services, VNFs and infrastructure deployed in the network. Service, VNF & Infrastructure description database 452 and OSS/BSS 450 can be connected to each other so that the OSS/BSS 450 can update and maintain the Service, VNF & Infrastructure description database 452 as needed.

NFVI 470 interacts with the VIM 448 through the NF-VI interface. Underlying resources can often be classified as compute resources 474, memory resources 478 and network resources 482. Memory resources 478 may also be referred to as storage resources, while network resources 482 may also be referred to as connectivity resources. A virtualization layer 472 allows for the abstraction of the underlying resources which it is connected to through a Vi-HA interface. It should be understood that the underlying resources may be either physical or virtual resources. The Virtualization layer 472 allows for the abstraction of the underlying resources into virtual compute resources 476, virtual memory resources 480 and virtual network resources 484. These virtualized resources can be provided to the element management system 454 through the VN-NF interface so that they can be used as the resources upon which the VNFs (shown as VNF1 458, VNF2 462 and VNF3 466) can be instantiated. EM 454 can be connected to the VNFM 446 within NFV MANO 432 through interface VE-VNFM, and to the OSS/BSS 450 through another interface. Each VNF instantiated upon the virtual resources provided by NFVI 470 can be associated with an element manager (EM1 456, EM2 460 and EM3 464). The use of an element manager allows the OSS/BSS to have two paths through which the VNFs can be managed. A VNF can be managed through the VNFM 446, or through the element manager associated with the VNF. Each element manager can provide the same management controls that it would otherwise provide for a physical network element. Thus, the OSS/BSS 450 can treat each VNF as a conventional network function. Modification to the resource allocation associated with a VNF can be requested by an element manager through the VNFM 446, or through a request from the OSS/BSS 450 over the OS-MA interface.

The virtualization of network functions allows functions to be deployed with the resources that are required. As the demand for the functions increases, the resources allocated to the functions can be increased, which avoids an intentional over provisioning of the functions at instantiation. In conjunction with the above described slicing and data center utilization, flexible networks can be deployed in a manner that allows an operator to dynamically modify the connectivity between functions (thus changing the logical topology of the network) and to dynamically modify the location of and resources allocated to the network functions (thus changing the physical topology of the underlying network). Additional resources at the same location can be allocated to existing function to allow for scaling up of an existing function, and resources can be removed from an allocation to allow for a scaling down of a function. Resources from more than one resource pool or data center can be allocated to a function so that it can be scaled out, and resources from different pools can be removed to allow a function to be scaled in. Functions can be moved by transferring their state information to another network function, and in some instances, a function can be moved through a combination of scaling out and scaling in functions.

ETSI GS NFV-MAN 001: "Management and Orchestration v1.1.1" (December 2014) and 3GPP Technical Reference (TR) 28.801 describe the concept of a Lifecycle of a Network Slice Instance (NSI). As may be seen in FIG. 5, the NSI lifecycle 500 generally proceeds through stages of: Preparation 502, Provisioning or Creation 504, Runtime 506 and Decommissioning 508. Preparation 502 typically includes NSI design 510 and pre-provisioning 512 functions, which may utilize one or more Network Slice Templates (NSTs). The Provisioning stage 504 may include functions for Instantiation of the NSI and Configuration of network resources (at 514) to support the NSI. This operation typically includes allocating physical (or virtualized) network resources to the NSI. Following completion of the Instantiation and Configuration operation 514, the NSI is established, and may handle traffic of one or more Communication Service Instances (CSIs). Activation of the NSI (at 516) may therefore involve forwarding traffic to the NSI (or to functions instantiated within the NSI), and transitioning the system to the Run-Time 506 stage of operation, during which traffic supervision and reporting functions may be performed. During run-time 506, parameters defining the NSI may be modified, for example in response to service updates affecting one or more CSI associated with the NSI or to increase or reduce the allocation of resources to the NSI.

In the case of an NSI instantiated for a single CSI, the NSI can transition to the Decommissioning stage 508 when that CSI is terminated. In the case of a shared NSI instantiated for two or more CSIs, the NSI will transition to the Decommissioning stage 508 when the last remaining CSI supported within the NSI is terminated. In either case, the decommissioning stage 508 generally involves deactivation of the NSI (at 518), which ends the flow of traffic to or through the NSI (or any of the functions instantiated within the NSI). Once the NSI has been deactivated, the NSI can be terminated (at 520) which releases network resources allocated to the NSI.

Typically, the steps of activation 516 and deactivation 518 are incorporated into the steps of Instantiation/Configuration 514 and Termination 520, respectively. For example, some ETSI documents such as GS NFV-MAN 001 mentioned above do not use the (de)activation terminology at all. For instance, NFV-MANO interface associated with lifecycle management of a network service includes instantiation and termination, as well as run-time management (scale, update, query the network service, and add/delete/update VNFs and VLs). A similar preference is observed in other publications related to NFV, such as whitepapers from the industry and NGMN terminology.

Similarly, VNF lifecycle includes steps such as authentication and authorization, but not (de)activation.

In some scenarios, it would be desirable to consider the activation and deactivation steps separately from other functions. For example, there may be scenarios in which it is desirable to maintain an NSI in an inactive state, without releasing its network resources, in anticipation of receiving a future service request. The present invention provides architectural options for accomplishing this result. It should be understood that although maintaining a resource allocation to an inactive NSI may prevent use of the resources, the creation of a new NSI typically takes more time and resources than the re-activation of an inactive NSI. The determination of when to leave an NSI in an inactive state as opposed to deactivating it with the option of activating a new NSI later, may be considered as an optimization problem whose solution is dependent upon the particular NSI configuration and characteristics of the underlying resources in question.

For the purpose of this application, an "active" or "Activation" state can be understood as corresponding to a condition in which CSI traffic flows in the NSI, and an "inactive" or "De-activation" state can be understood as corresponding to a condition in which there is no CSI traffic in the NSI. Note that in the inactive state, the NSI still exists, meaning that the resources, configurations etc. are reserved for future use by the NSI (and as such these resources may not be available for use by other NSIs).

An alternative state for NSI may be "existence" and "inexistence". During both "Activation" and "Deactivation" states, the NSI exists, as explained above. During Preparation 502, the NSI does not exist. At the end of the Provision phase 504, the NSI exists, and at the end of the Decommissioning phase (Termination operation 520) the NSI does not exist (inexistence).

Figure 5:
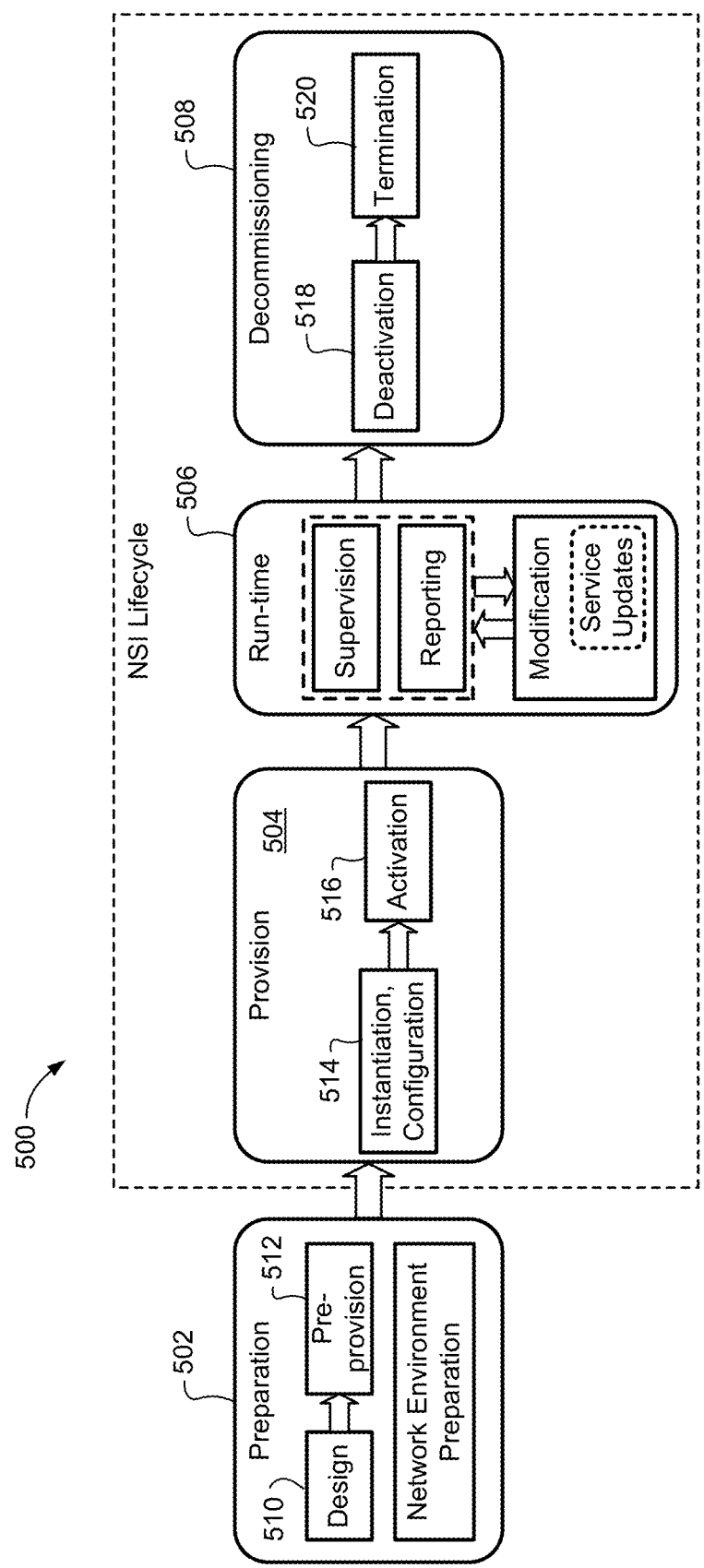
FIG. 5 is a block diagram illustrating a Network Slice Instance (NSI) Lifecycle known, for example from TR 28.801.

3GPP TR 28.801 does not contemplate the lifecycle of an NSI having a state in which it consumes resources but is not active. Furthermore, there has been no contemplation of an NSI moving from a De-activation state to an Activation state, as shown in FIG. 5.

Allowing such transition from Deactivation to Activation states can alleviate the preparation, instantiation, and configuration phases. That can enable agile responses to communication service requests. It is especially useful if such usage of a NSI is forecasted but there is currently no need to divert traffic/provide databases/manage the NSI.

Lifecycle Options for NSI

The following options can be discussed for Lifecycle management (LCM) of NSI. Service updates are shown to indicate (or hint towards) the relationship between NSI and CSI lifecycles, which is explained in the following Section in more detail. FIGS. 6A-6L are block diagrams illustrating a Network Slice Instance (NSI) Lifecycle with respective examples of bi-directional transitioning between the run-time phase and each of the Provisioning and Decommissioning phases of the NSI Lifecycle.

Figure 6A:
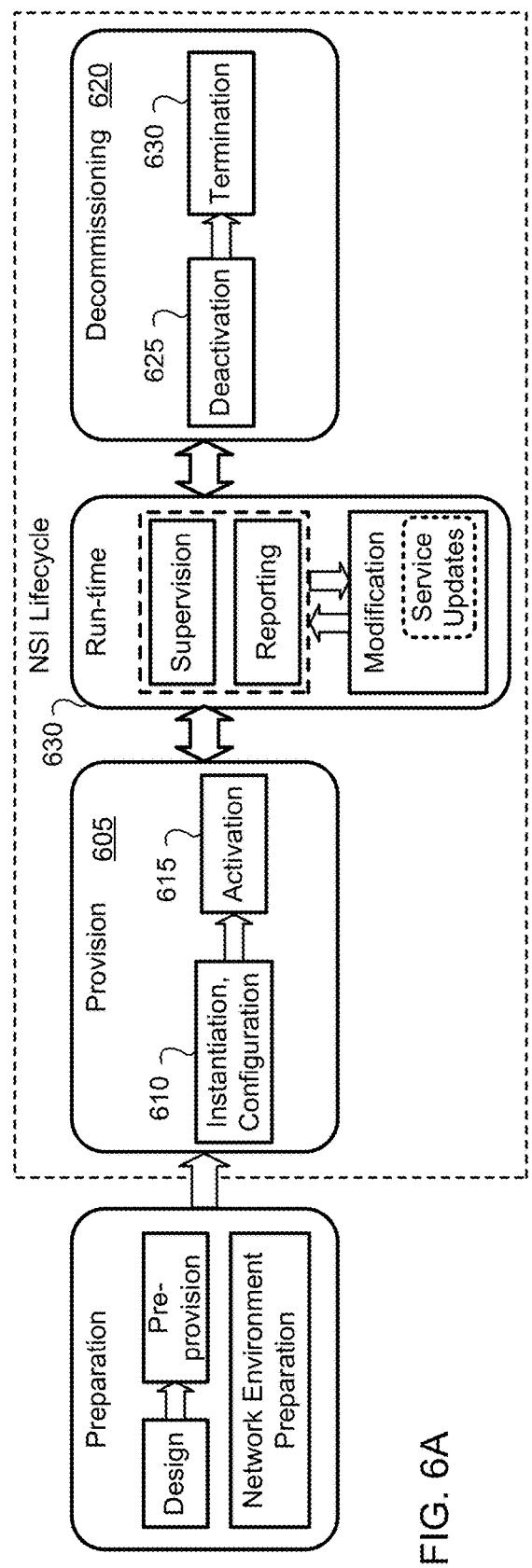
FIGS. 6A-6L are block diagrams illustrating a Network Slice Instance (NSI) Lifecycle with respective examples of bi-directional transitioning between the run-time phase and each of the Provisioning and Decommissioning phases of the NSI Lifecycle, in accordance with representative embodiments of the present invention.

The example of FIG. 6A implies that it is possible to return back to the Run-time phase from the Decommissioning phase, and similarly it is possible to return back to the Provision phase from the Run-time phase. Monitoring is possible during run-time.

The example of FIG. 6A illustrates an improvement over the example of FIG. 5. The example of FIG. 5 illustrates deactivation 518 occurring during decommissioning 508. Once a network slice is deactivated 518 it will be terminated 520. The example of FIG. 5 does not allow a network slice to be deactivated and slice's resources to be retained. However, the example of FIG. 6A allows for a slice to be deactivated 625 (i.e., put into an in an inactive state for future use) while its resources retained. The example of FIG. 6A can return back to run time 630 to reactive the deactivated network slice. The example of FIG. 6A also allows for the return to provisioning 605.

Figure 6B:
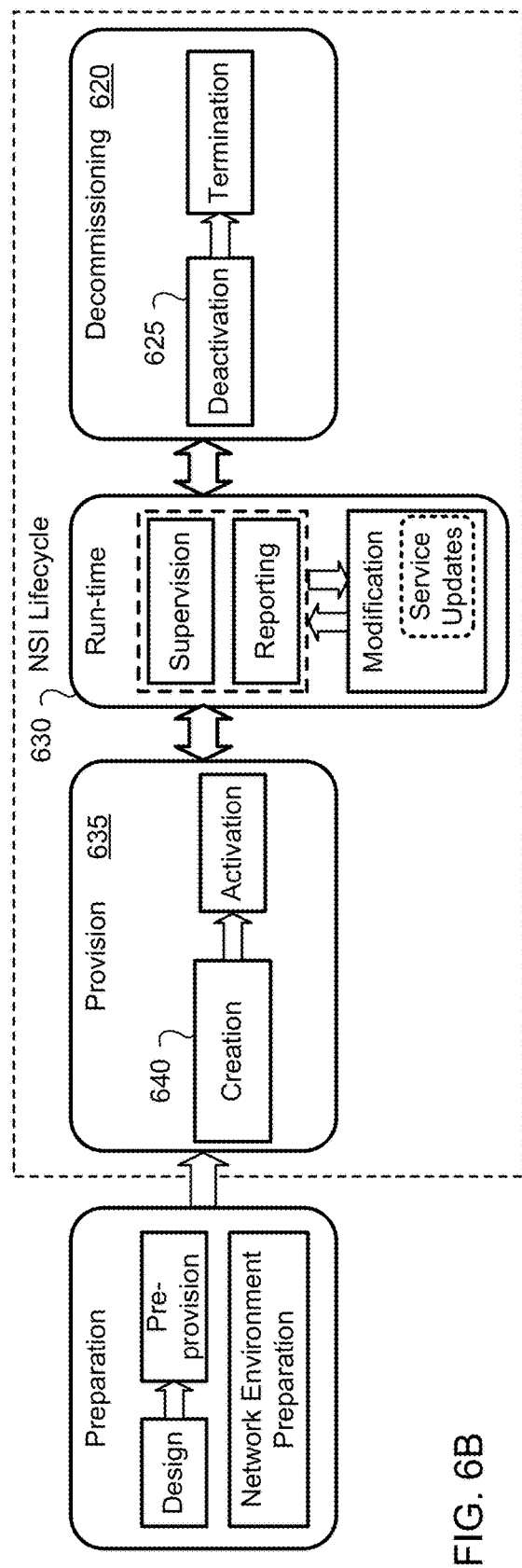

The example of FIG. 6B illustrates the same ability of deactivation 625 and retention of a network slice's resources when the network slice is decommissioned 620, ability to return to run-time 630, and the ability to return to provisioning 605 as FIG. 6A. The difference between the example of FIG. 6A and the example of FIG. 6B is that the instantiation, configuration 610 during provisioning 605 of FIG. 6A are illustrated as creation 640 during provisioning 635 in FIG. 6B.

Figure 6C:
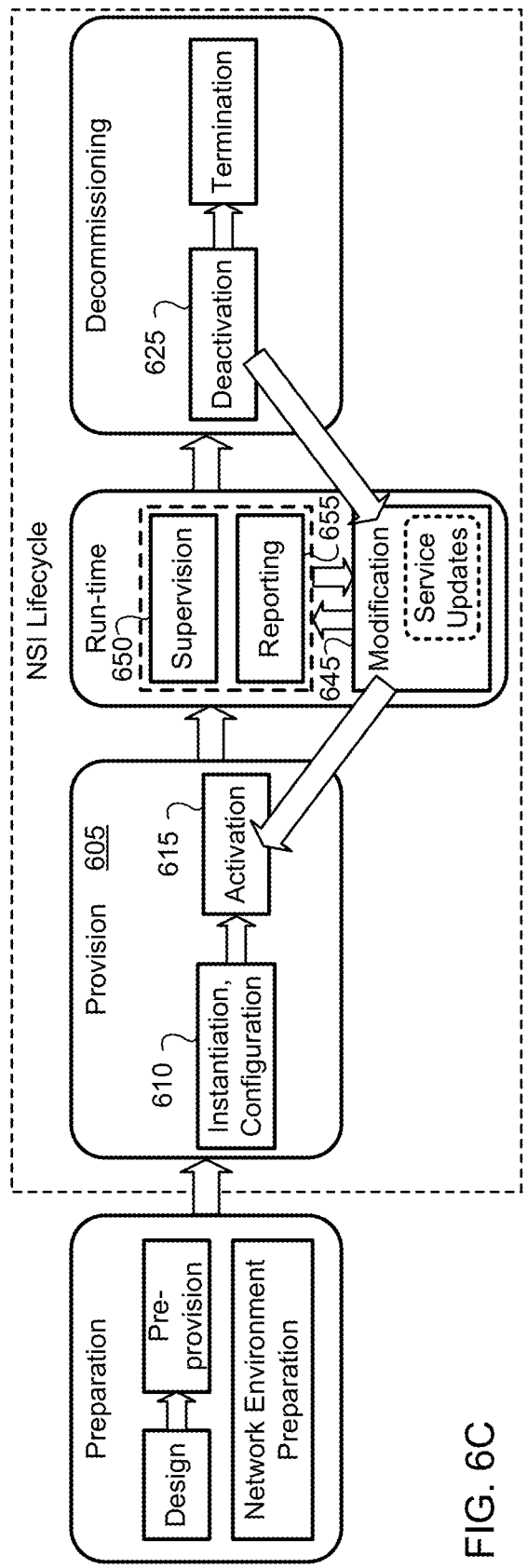

The example of FIG. 6C uses two additional state transitions to precisely allow returning from a De-activation state 625 to an Activation state 615 via Modification operations 645 (e.g. though the use of a modification operation, an NSI in the deactivation state can be moved back to the activation state, which may allow for an NSI that has had some of its resources released to be re-provisioned (possibly with the released resources reallocated to the NSI)).

Figure 6D:
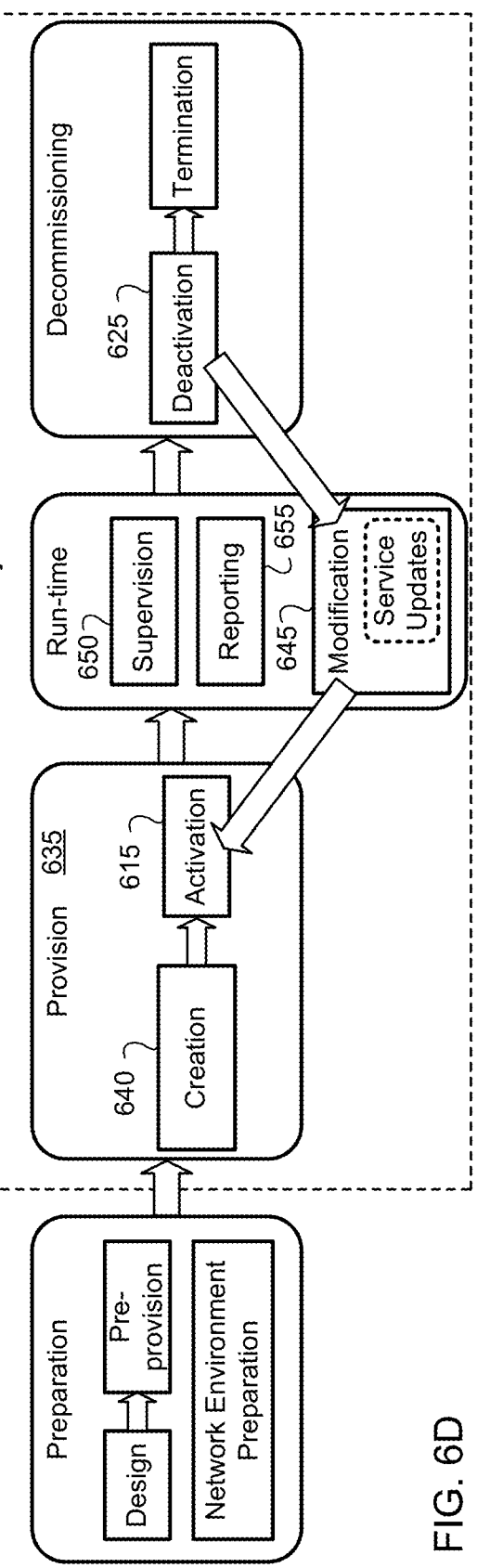

The example of FIG. 6D illustrates the same two additional state transitions as illustrated by FIG. 6C. A difference between the example illustrated by FIG. 6C and the example illustrated by FIG. 6D is the run-time operations. The run-time operations illustrated in FIG. 6C, supervision 650 and reporting 655, are sequential to modification 645. However, the run-time illustrated in FIG. 6D, supervision 650, reporting 655, and modification 645 are performed in parallel.

Another difference between the example illustrated by FIG. 6C and the example illustrated by FIG. 6D is in provisioning. Example FIG. 6C provisioning 605 instantiation, configuration 610 is replaced in FIG. 6D's provisioning 635 with creation 640.

Figure 6E:
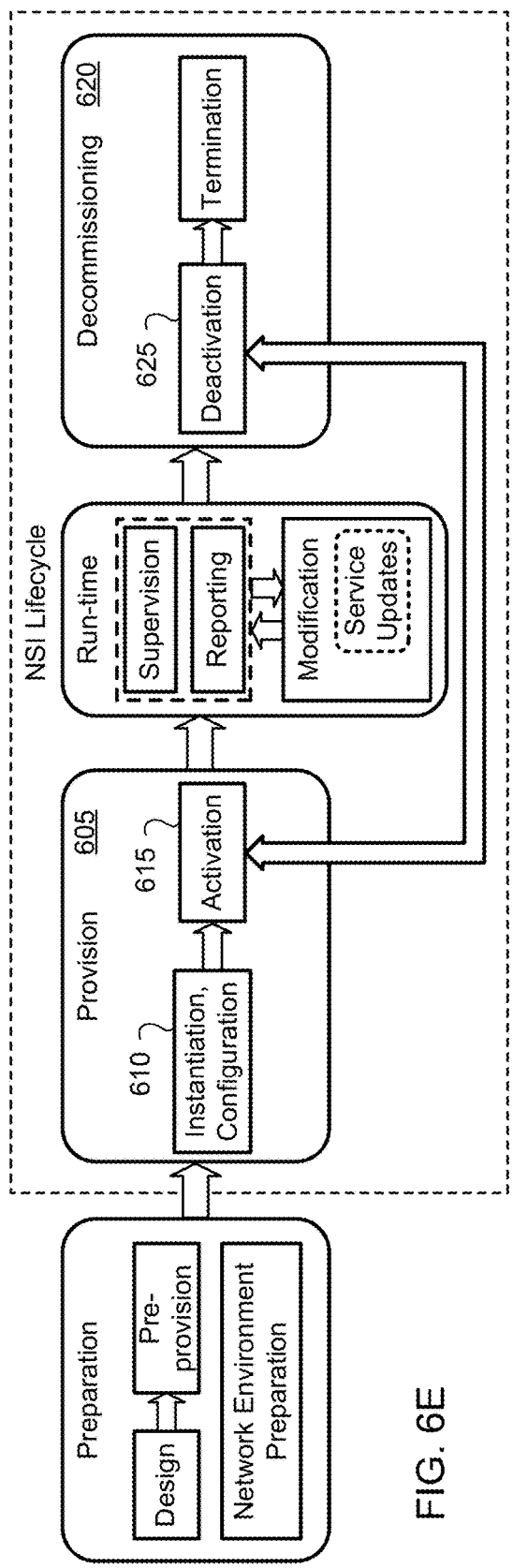

The example of FIG. 6E shows a direct state transition between an Activation state 615 in the provision phase 605 and a De-activation state 625 within the decommissioning state 620.

Figure 6F:
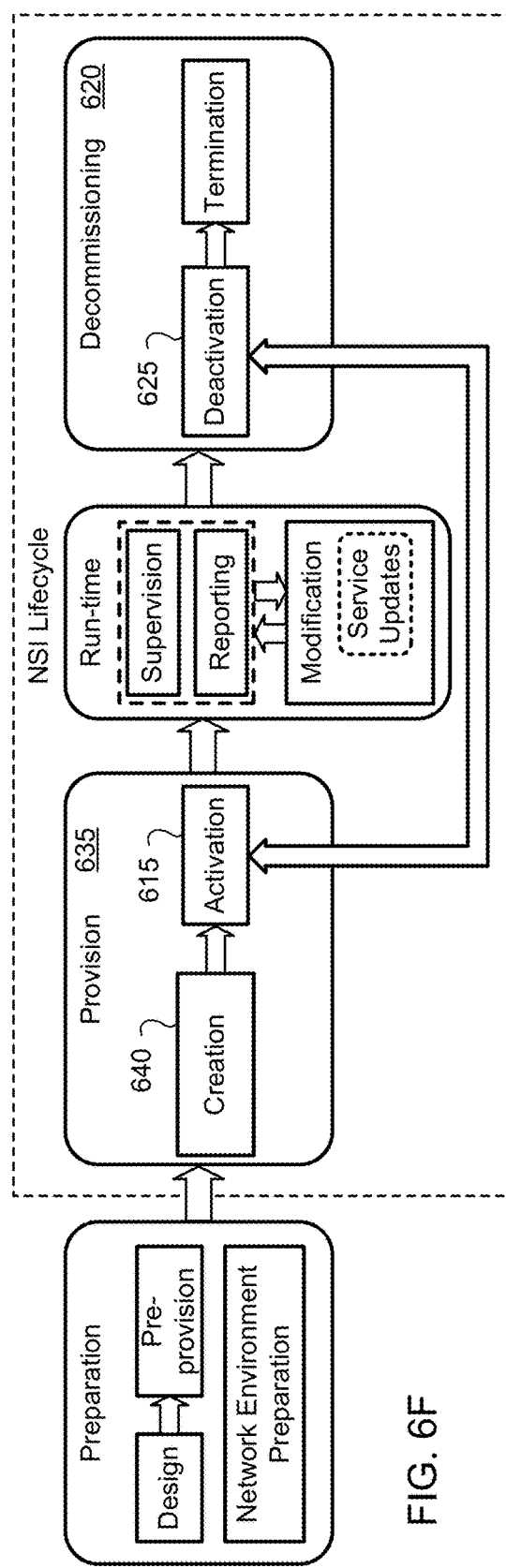

The example of FIG. 6F illustrates the same direct state transition illustrated by FIG. 6E. However, the difference between the example illustrated by FIG. 6E and the example illustrated by FIG. 6F is the instantiation, configuration 610 of FIG. 6E's provisioning stage 605 is replaced by FIG. 6F's provisioning 635's creation 640.

Figure 6G:
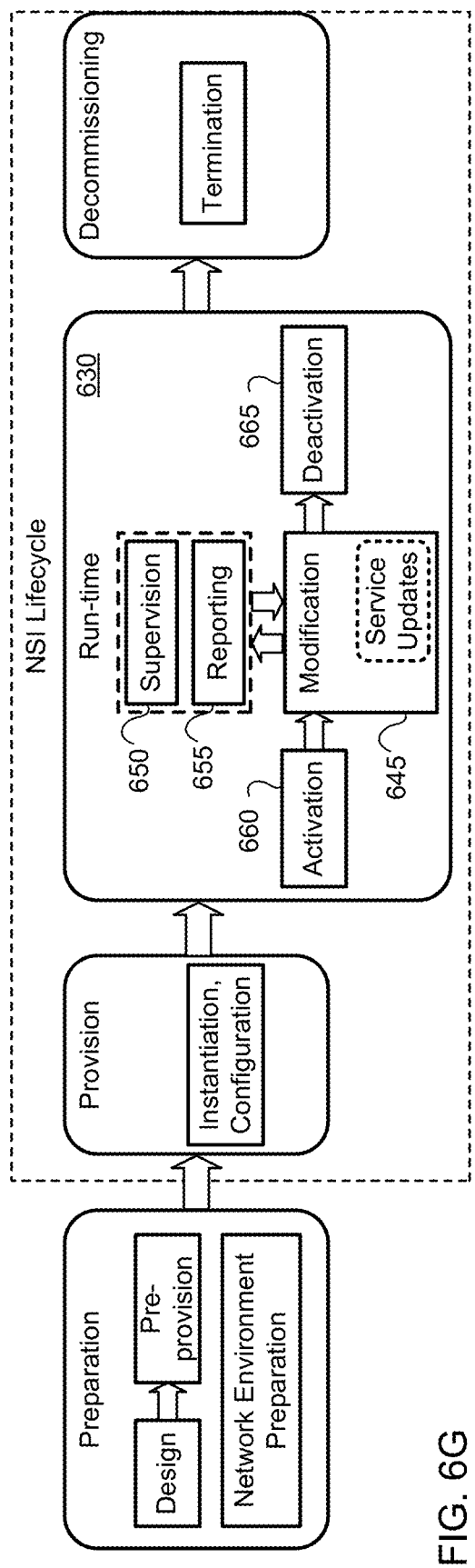

The example of FIG. 6G shows an architectural option where activation 660 and de-activation 665 states are included in the run-time phase 630. It should be understood that the use of the modification operations 645 of the run-time phase 630, it may be possible to move from both the left to the right, and from the right to the left in this figure (although the arrows are illustrated as unidirectional, it may be possible to implement a bidirectional arrow through the use of the modification operations.)

Figure 6H:
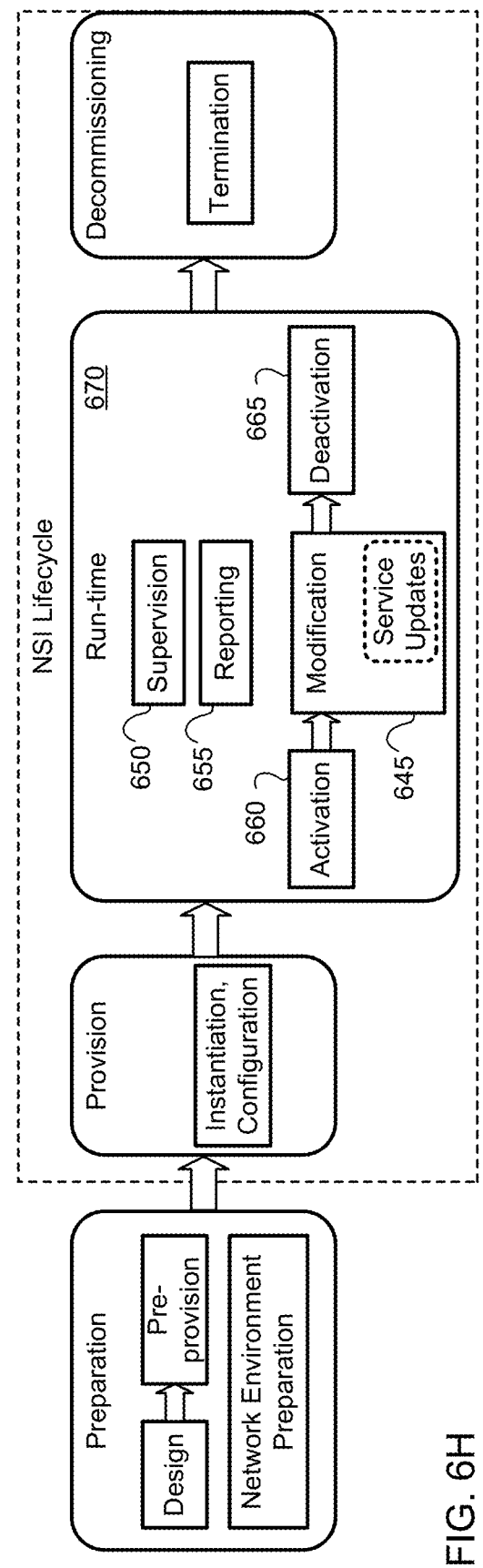

The example of FIG. 6H illustrates the same architectural option as illustrated by FIG. 6G. A difference between the example illustrated by FIG. 6G and the example illustrated by FIG. 6H is the run-time operations. The run-time operations 630 illustrated in FIG. 6G, supervision 650 and reporting 655, are sequential to modification 645. However, the run-time operation 670 illustrated in FIG. 6H, supervision 650, reporting 655, and modification 645 are all performed in parallel.

Figure 6I:
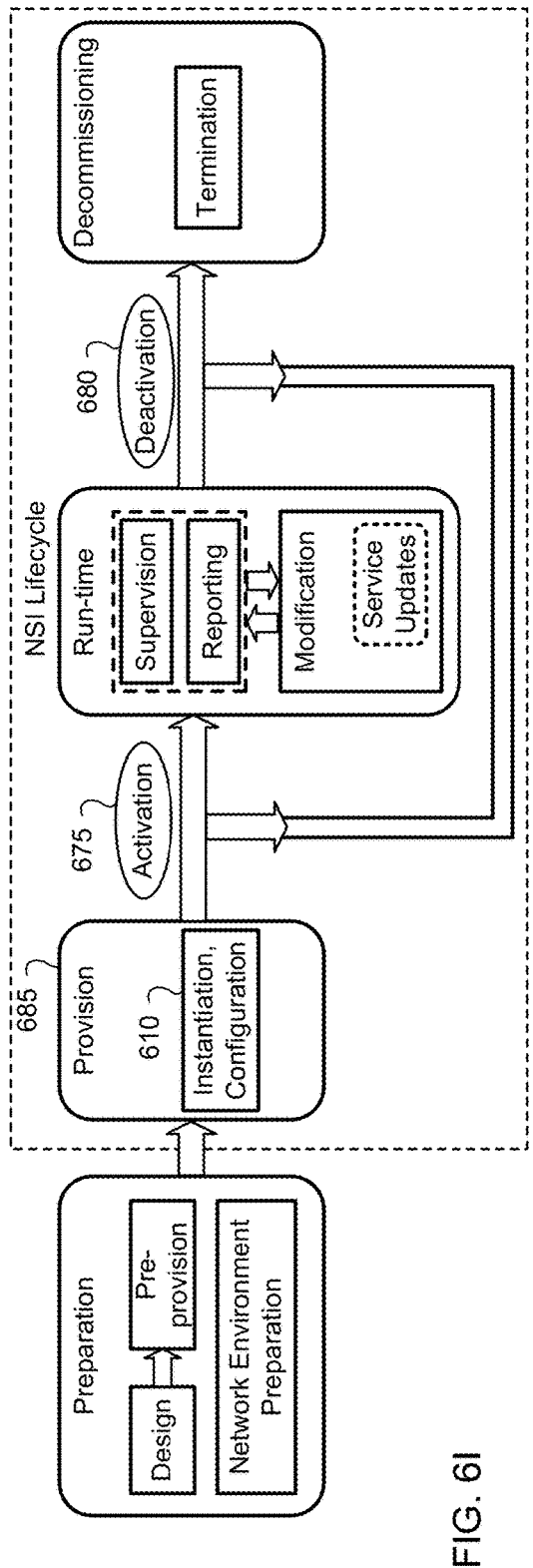

The example of FIG. 6I shows De-activation 680 and Activation 675 as transition phases, rather than being one of the states within a particular phase.

Figure 6J:
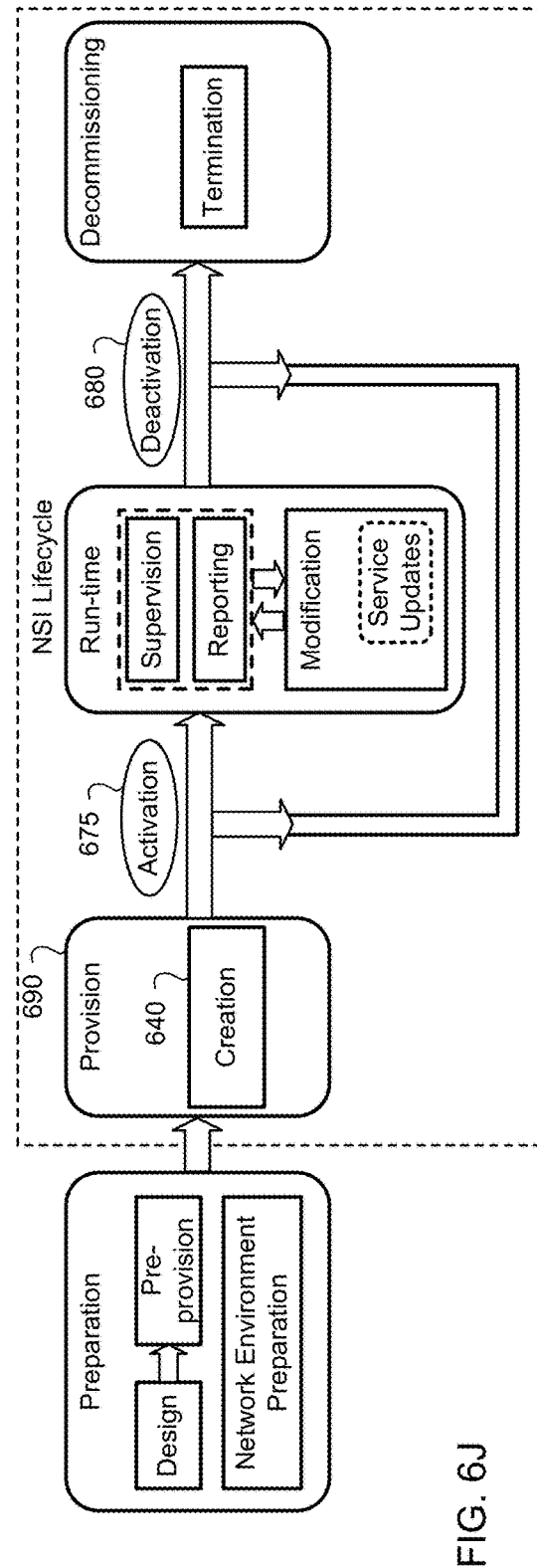

The example of FIG. 6J also shows De-activation 680 and Activation 675 phases as transition phases in the same way as FIG. 6I's De-activation 680 and Activation 675. However, FIG. 6I's provision 685's instantiation, configuration 610 is illustrated in FIG. 6J as provision 690's creation 640.

Figure 6K:
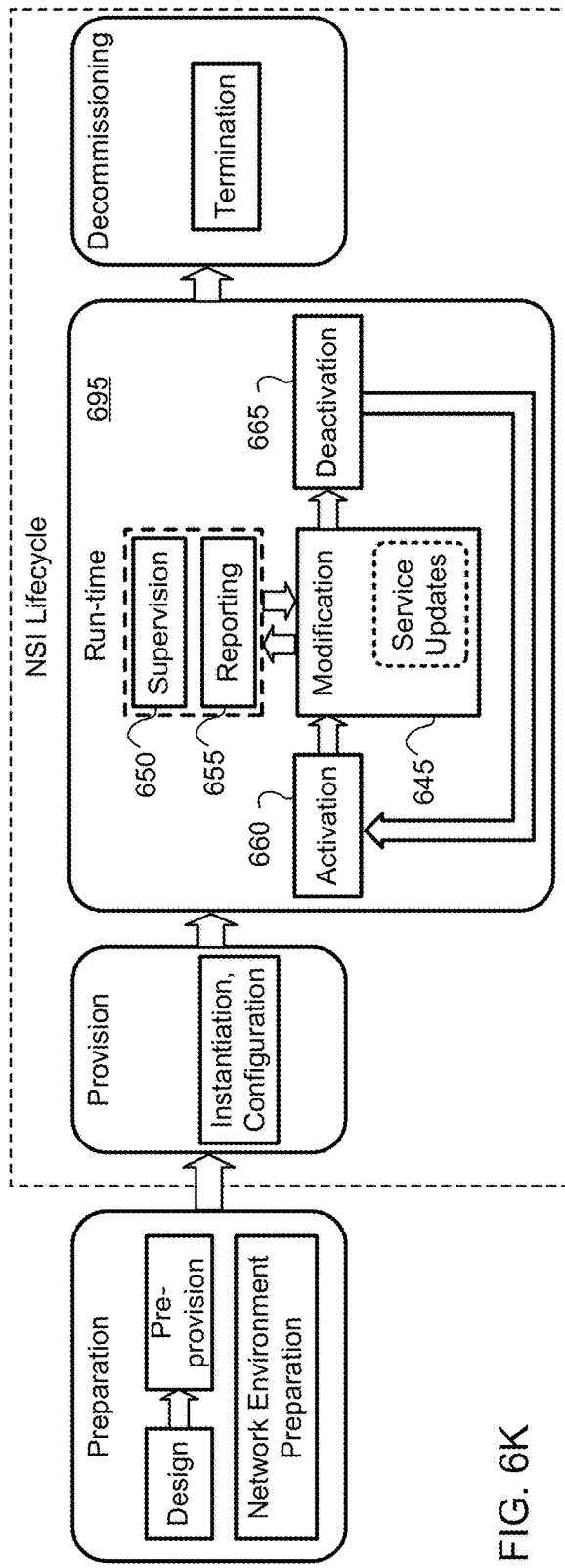

The example of FIG. 6K shows De-activation 665 and Activation 660 as states within the in Run-time phase 695, with a clear procedure for the transitioning from a deactivation state 665 to an activation state 660. Such as transition may be possible without necessarily requiring the use of a modification operation.

Figure 6L:
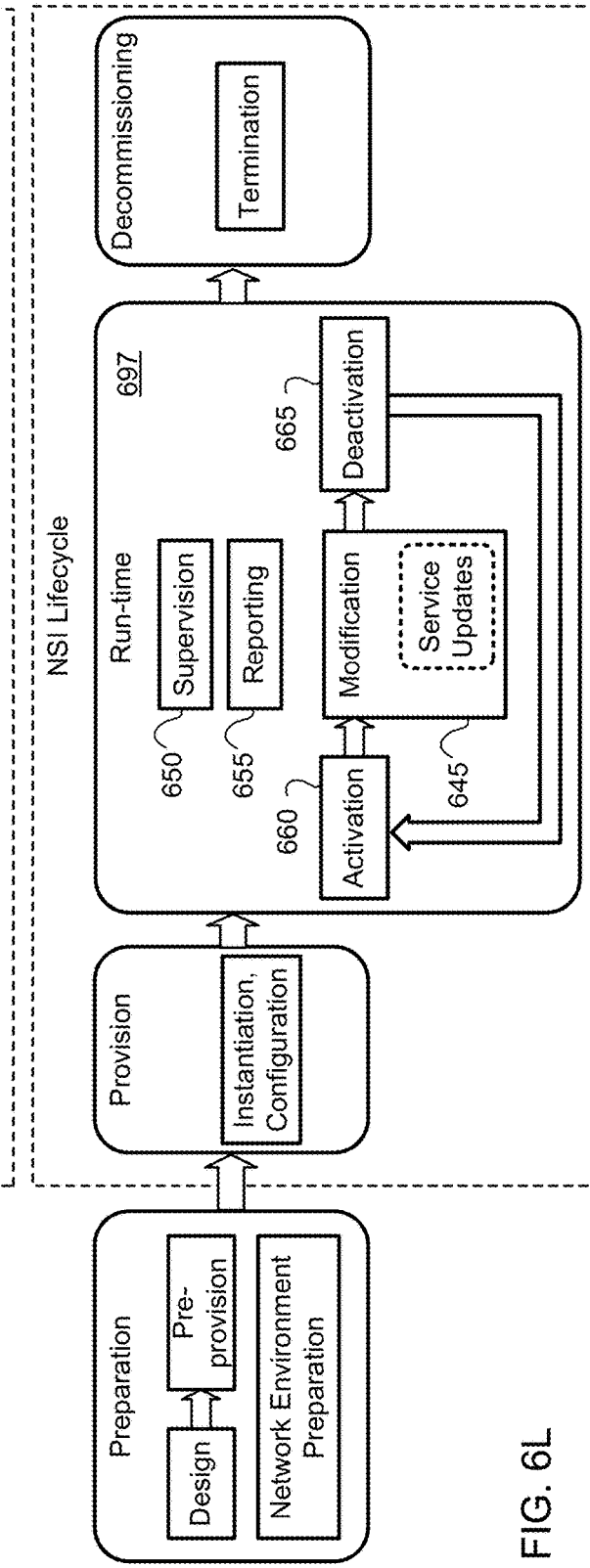

The example of FIG. 6L also illustrates a clear procedure for the transitioning from a deactivation state 665 to an activation state 660. However, the difference between the example illustrated by FIG. 6K and the example illustrated by FIG. 6L is the run-time operations. The run-time operations 695 illustrated in FIG. 6K, supervision 650 and reporting 655, are sequential to modification 645. However, the run-time operation 697 illustrated in FIG. 6L, supervision 650, reporting 655, and modification 645 are all performed in parallel.

Communication Service Instance Lifecycle

Communication service instance (CSI) lifecycle management includes service negotiation, service requirement preparation, deployment of the CSI to a NSI, CSI operation, and CSI termination phases. Upon receipt of a service request, any or all of the following operations may be initiated to deploy a CSI on an NSI:

Service request A is sent to a Service Manager (SM), such as a Business Service Manager (BSM). The BSM establishes Service Level Agreement (SLA) A. The BSM sends the internal service requirements associated with SLA A to Customer Service Management Function (CSMF). The CSMF sends the NSI requirements to a Network Slice Management Function (NSMF) (optionally using a CSI template format). The NSMF selects internal an NST (shared or dedicated) or creates a new NST and fills the attributes. Network slice instance profiles may be generated with slice specific information (and optionally with a slice specific identifier)

CSMF retrieves or otherwise receives service requirements and then selects a suitable NST from NSMF catalogue (shared or dedicated). If there is no suitable NST, the CSMF may use a default/universal NST format and send the request (which may take the form of a Network Slice Instance Profile (NSIP)) to the NSMF.

CSMF gets service requirements. The CSMF Selects a suitable existing NSI and sends the request to share the selected NSI via NSIP (no NST creation/selection, direct access to NSIP with specific values and profile number). The NSMF performs modifications etc. on the specific NSI. (The Network slice requirements identifies, for example, the Network Functions (NFs) or chains of NFs for different flows, the geographical coverage required, etc.)

The BSM receives service request. The BSM establishes an SLA and passes the attributes to CSMF. The CSMF maps the received SLA attributes to a communication service template in the E2E service catalogue. The CSMF establishes the communication service instance specification (CSI requirements) with network requirements and passes it to NSMF. The NSMF creates a new NSI via existing NS Ts or creates a new NST, or modifies a pre-existing sharable NSI. The NSMF performs slice specific LCM for NSI based on updates on CSI.

Communication service instance (CSI) lifecycle management may include service negotiation, service requirement preparation, deployment of the CSI to a NSI, CSI operation, and CSI termination phases.

Two options related to the lifecycle of a communication service instance and an NSI are:

A NSI(s) may be exclusively used for a single communication service instance, which means that the preparation of the NSI(s) is triggered by the associated CSI.

An NSI may be used by multiple communication service instances, for which the lifecycle of the service instance is related with the run-time phase of the shared (pre-existing) NSI(s), and triggers modification(s) on the (pre-existing shared) NSI.

In both cases, the communication service instance lifecycle includes the following phases.

Service negotiation phase: Service agreements are established in this phase.

Service requirements preparation: The service request is evaluated against the available capacity and resources to have feasibility check, and if available, service requests are established.

Deployment of CSI to NSI: In this phase, communication service requirements are converted to network slice requirements and a new NSI is created or an existing NSI is selected based on whether it is for case 1 or case 2 mentioned above. Alternatively, the CSI can be deployed on one of multiple existing NSIs.

Communication service instance operation: In this phase, the 3GPP management system should start supervision and reporting steps of the NSI. When multiple communication services are in use, the supervision and reporting may be done on per service basis. Service based updates can be converted to network requirements which can be used in either the provisioning of a new NSI, or in the modification operations associated with an existing NSI.

Communication service instance termination: If the NSI is serving only one communication service instance, when the service is terminated the NSI can be decommissioned. In some embodiments, the NSI may be deactivated without decommissioning. If the NSI is serving multiple communication service instances, a modification operation during the run-time phase can be used to add or delete a service when the NSI already exists.

Figure 7:
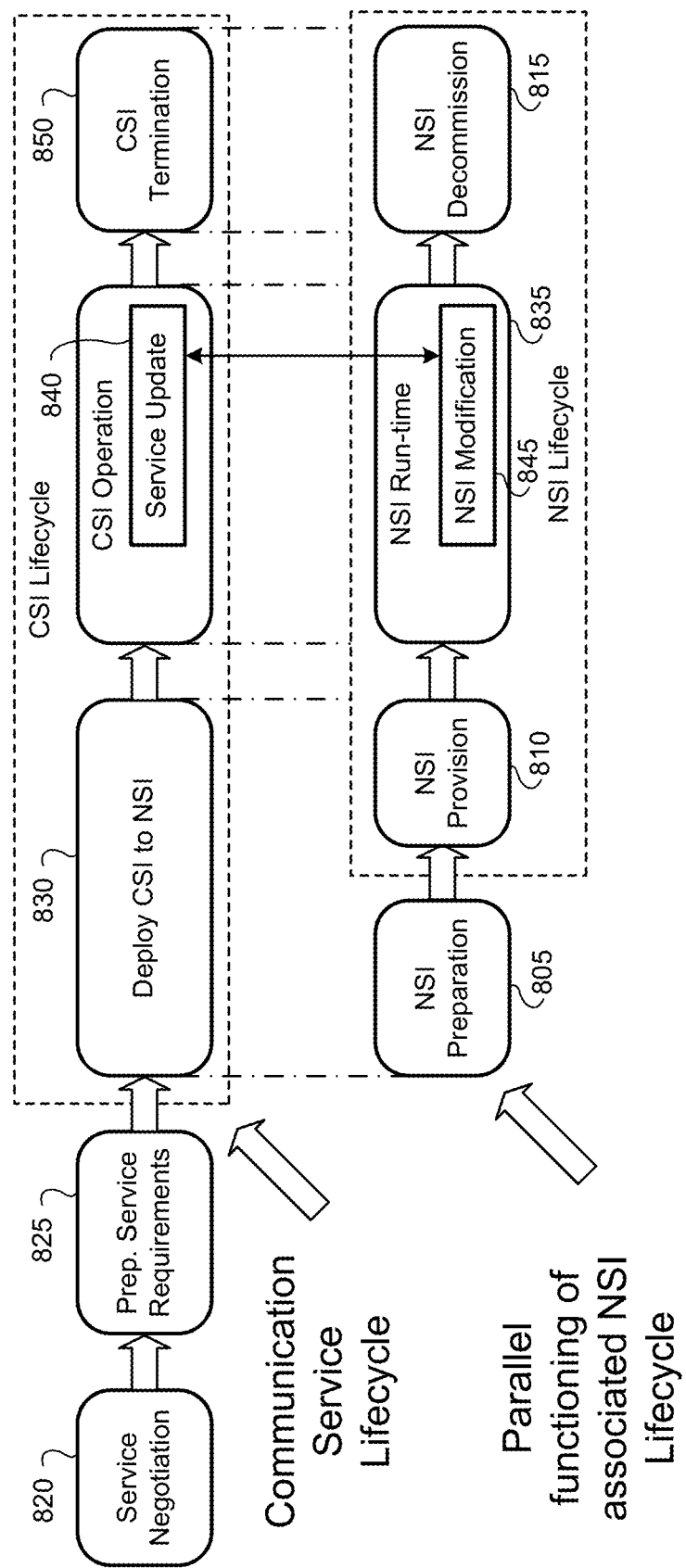
FIG. 7 is a block diagram illustrating example relationships between a Network Slice Instance (NSI) Lifecycle and a Communication Service Instance (CSI) Lifecycle in accordance with representative embodiments of the present invention.

The management functions and procedures described above relate to embodiments using a hierarchical management architecture. However, in other embodiments, these management functions (e.g, CSMF, NSMF, NSSMF and NFM) can also be implemented as service providers (or consumers) in a service-based management architecture. For instance, CSMF can be a communication service management provider (CSM_P, where "P" stands for provider). Similarly, NSMF, NSSMF and NFM, can also be management service providers (or consumers), e.g., NSM_P, NSSM_P, NFM_P, respectively Relation Between Communication Service Instance Lifecycle and NSI Lifecycle FIG. 7 shows the relationship between CSI lifecycle and the NSI lifecycle when an NSI is exclusively used for a communication service instance. When a new NSI is created the NSI operations happen in parallel as depicted in FIG. 7. These operations include the operations in all NSI lifecycle phases, including Preparation 805, Provision 810, and Decommissioning 815 phases. Preparation of the NSI is triggered by the CSI.

Following a Service Negotiation 820, and the preparation of service requirements 825, the NSI preparation 805 and deployment of the CSI to the NSI 830 can be started in parallel. The NSI provisioning 810 follows the NSI preparation 805, and it can conclude at the same time as the end of the deployment of the CSI to the NSI. Those skilled in the art will appreciate that deploying a CSI to its own NSI (assuming that the NSI is not already prepared and provisioned) will require the preparation and provision of the NSI. The operation of the NSI and the CSI will be largely overlapping as well, as the CSI cannot function after the end of the NSI runtime 835, and as the NSI does not necessarily need to be maintained if the CSI is complete. Updates to the CSI 840 may be reflected as modifications to the NSI 845. Similarly, if the NSI is modified, the CSI may be adjusted as well. The termination of the CSI 850 is likely to be overlapping with the NSI decommissioning 815, unless the NSI is deactivated without decommissioning as discussed elsewhere. An example of a change in the NSI leading to an adjustment to the CSI can be as follows. If the resources of NSI are reduced, the capacity that can be allocated to the NSI for the CSI is reduced. The CSI may be modified to allow for additional NSIs to serve the CSI. For example, if CSI was to serve 100 customers but the NSI capacity is reduced from a capacity which can support 100 customers to a capacity which can serve 50 customers, then negotiation or notification to serve 50 customers using an additional NSI may be provided. After this notification, the CSI is modified, for example, to include serving the remaining 50 users with the other NSI.

Figure 8:
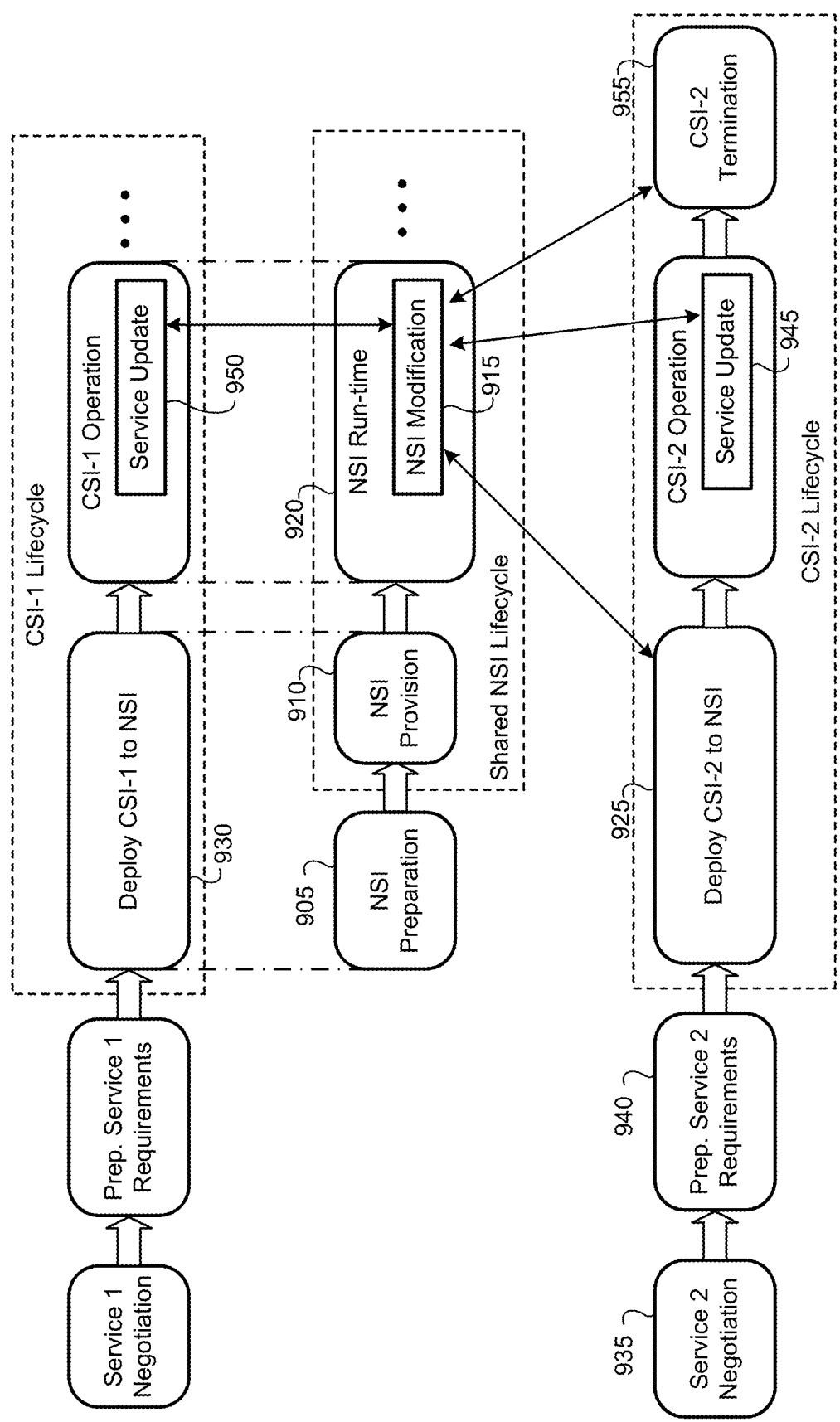
FIG. 8 is a block diagram illustrating example relationships between a Shared Network Slice Instance (NSI) Lifecycle and a pair of Communication Service Instance (CSI) Lifecycles in accordance with representative embodiments of the present invention.

FIG. 8 shows a scenario for the relationship between CSI lifecycle and the NSI lifecycle when a sharable NSI is used to provide multiple communication service instances. Only two CSIs are shown in FIG. 8; more than two CSIs may share a NSI. Additional CSIs may follow a similar process to that indicated for the CSI-2. NSI preparation 905 is triggered by the requirements to deploy a first CSI 930 (CSI-1 in FIG. 8). NSI operations, including the operations in Preparation 905 and Provision 910 phases, continue in parallel to the operations of CSI-1, much as they are described above with respect to FIG. 7. Later, NSI Modification 915 is triggered by the deployment of the second service (CSI-2 in FIG. 8) on NSI. NSI operations in Runtime phase 920 continues in parallel to the Service 2 lifecycle.

The NSI modification 915 is a direct response to the deployment of CSI-2 925. A second service negotiation 935, and a preparation of a second set of service requirements associated with CSI-2 940 trigger the deployment of CSI-2 to the NSI 925. Because the NSI is already active, this may require modification of the NSI 915, including the allocation of additional resources to the NSI. As CSI-2 is deployed to the NSI 925, any further changes to the NSI can be communicated to both CSIs through the service update procedures 945 and 950. Although FIG. 8 illustrates the termination of CSI-2 955 before the termination of CSI-1, it is immaterial as to which service is terminated first. A termination of a CSI within the NSI may trigger an NSI modification 915 as the network functions used to support the CSI are deactivated or decommissioned. This may result in a change in the resource allocation to the NSI. Any changes to the NSI resource allocation may result in a notification to the service update procedures (and associated network functions) within remaining CSIs. When the final CSI operating within the NSI is terminated, the NSI itself can be deactivated or decommissioned, either in parallel to the CSI termination (as illustrated in FIG. 8) or subsequent to the CSI termination.

Figure 9:
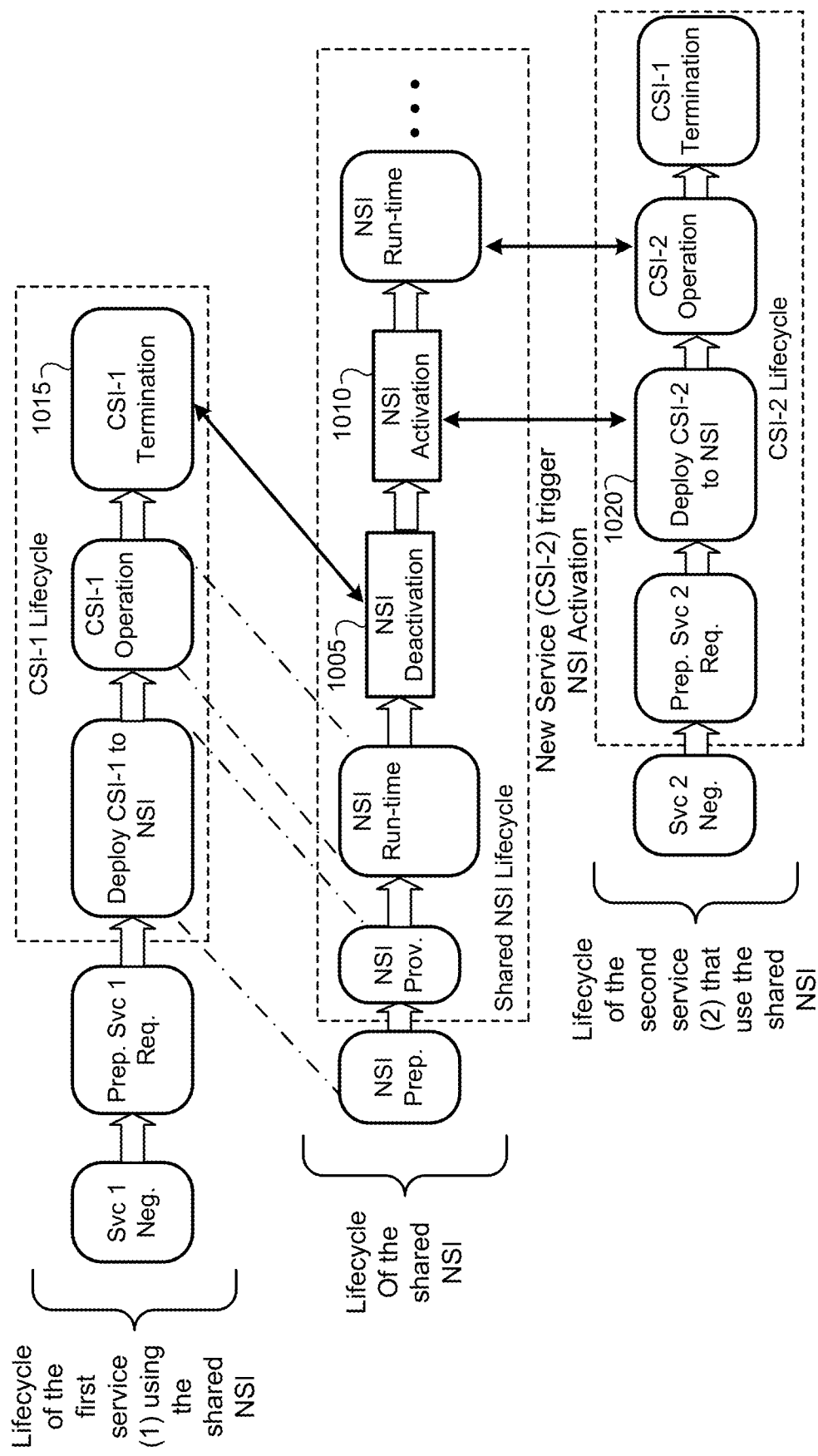
FIG. 9 is a block diagram illustrating example operations between a Shared Network Slice Instance (NSI) Lifecycle and a pair of Communication Service Instance (CSI) Lifecycles in accordance with representative embodiments of the present invention.

FIG. 9 shows that a NSI can be activated and de-activated based on service requests. FIGS. 6A-L shows various processes in the transition of an unshared NSI from a deactivated state to an active state. It should be understood that these transitions can also be performed by an NSI that can be shared among CSIs. Activation 1010 and De-activation 1005 operations can either be considered as Run-Time operations, or Provision and Decommissioning phase operations. At all cases, CSI Termination 1015 can trigger NSI De-activation 1005 operation (which may occur in place of the NSI Decommissioning operation shown in FIG. 7). Deployment of another CSI 1020 can trigger the return to an activation state 1010 of an NSI that was previously in a deactivation state.

As may be appreciated, separate handling of activation/deactivation functions can be accomplished by suitable modification of the MANO NFV Orchestrator (NFVO) implemented in a suitable server or data center, as desired. The overall actions needed, and the steps of a procedure according to an embodiment, including interaction between NSI and CSI, can be listed as follows:

Step [1]: Communication service request including service agreements

Step [2]: Communication service negotiation, communication service admission control (admission control has multiple mini (or sub) steps) and SLA establishment. Sub-steps for step [2] can include:

Service terms and SLAs are negotiated. SLA may be established by accessing to an SLA Database, customer service type catalogue, or can be created from scratch, for which service capability type attributes may be used.

Service admission control may map service instances to established SLAs. It may include asking NSMF the availability of resources/capacity, or checking the loading catalogue of NSMF. Possibility of acquiring new resources/NSSI for the service and using/sharing existing resources/NSSIs, exposer levels, accounting requirements, NF graphs for different service flows can be checked. Admission control allows accepting services such that existing services are not affected by a newly added service, such that the new service requirements can be fully satisfied. Accordingly, information regarding network (e.g., remaining virtual resource capacity, throughput of segments, etc.) is collected continuously, such that a decision can be made as to whether to accept a new service, or reject it.

NSMF may in turn ask NSSMFs or other domains to get the resources or services.

Some may expose the remaining capacity in which case only temporary reserve request need to be sent during the admission control process to those NSSMFs.

Slice specific attributes, templates, and descriptors may be determined during admission control. It may include slice design, pre-provision, and network environment preparation phases.

Step [3]: Internal service requirement preparation based on SLA: Communication service instance specific values and descriptors may be determined. A service type catalogue may be used for that purpose. The service instance may be ready to be deployed.

Step [4]: Existing NST selection or creation of a new NST or use a default universal NSI template.

Step [5]: Slice design (e.g. SDT, SDRA) includes determining slice specific values and descriptors based on selected NSTs. This may also happen during admission control, e.g. without some kind of design we cannot say we can accommodate a new service or not, in addition if different domain is involved we need to ensure the resources are available with them and request them to reserve the resources temporarily—without allocating to other slices.

Step [6]: Slice pre-provision—includes informing the resource acquisition for this slice with NSSMFs, PNFs etc.

Step [7]: Slice creation: a CSI may be deployed after an NSI is created and activated. If a pre-existing NSI is used to deploy the CSI, a run-time phase operation may be employed. FIG. 9 shows a double headed arrow between the NSI activation 1010 and deploy CSI-2 to NSI step 1020. Examples of information the CSI can send include a request to activate the slice, the network requirements and service requirements to be monitored (e.g., session QoS levels) etc.

Step [8]: Run-time—modification steps, service update etc.

Slice re-design: In the case of multiple services in a slice, the re-design step which may include capacity resource increase or decrease, topology updates etc. Further, capability of the slice can change. For example operation policies may change (e.g., session admission rules, path selection rules, NF chains, etc.).

Supervision and Reporting operations may take place on at least one of a per-slice and a per-communication service basis (e.g in a shared slice).

Step [9]: Termination

Slice decommissioning: If NSI is not shared, release resources. It can be timed.

Slice modification: If NSI is shared, release the resources used by the CSI.

Slice de-activation: Keep the NSI for future use, e.g., a similar communication service request is forecasted.

Figure 10:
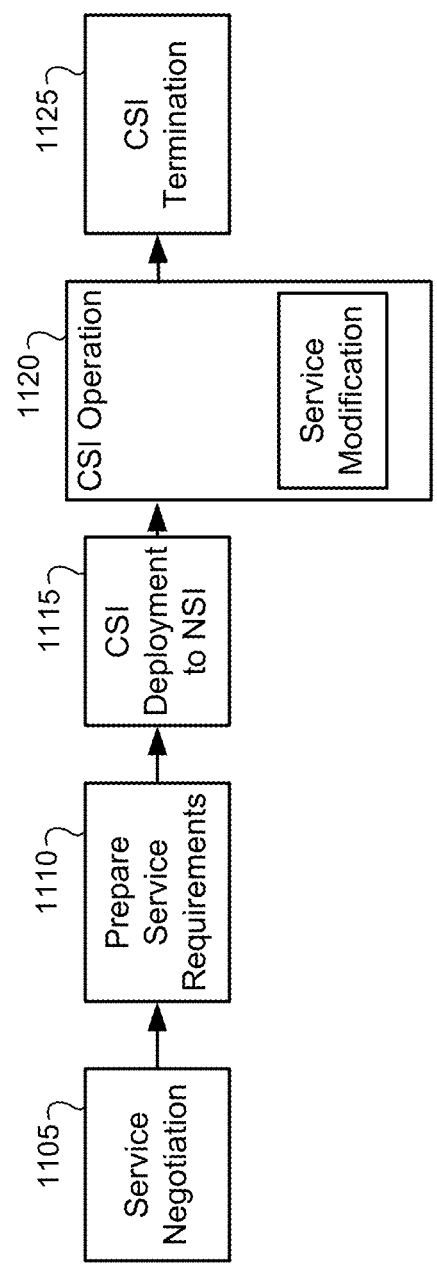
FIG. 10 is a block diagram illustrating an example of a lifecycle of a CSI according to an embodiment.

FIG. 10 illustrates a set of phases in a lifecycle of a CSI. These phases may include service negotiation 1105, service requirement preparation 1110, deployment of the CSI to a NSI 1115, CSI operation 1120, and CSI termination 1125 phases. With respect to the lifecycle of a CSI and an NSI, the NSI(s) may be exclusively used for a single communication service instance, which means that the preparation of the NSI(s) is triggered by the associated CSI, and alternatively, an NSI may be used by multiple communication service instances, for which the lifecycle of the service instance is related with the run-time phase of the shared NSI(s), and triggers modification(s) on the NSI. In both cases, the communication service instance lifecycle includes the following phases:

Service negotiation phase: Service agreements may be established in this phase.

Service requirements preparation: The service request can be evaluated against the available capacity and resources so that a feasibility check can be provided before deployment. If sufficient resources are available, service requests can be established.

Deployment of CSI to NSI: In this phase, communication service requirements can be converted to network slice requirements and, if needed, a new NSI can be created. If an existing NSI can be selected. The selection of an existing NSI can be based on any number of different scenarios, including those discussed above.

Communication service instance operation: In this phase, the 3GPP management system can start supervision and reporting for the NSI. When multiple communication services are in use, the supervision and reporting may be done on per service basis.

Communication service instance termination: If the NSI is serving only one communication service instance, when the service is terminated the NSI is also decommissioned. If the NSI is serving multiple communication service instances, the modification phase of the NSI is used to add or delete a service when the NSI already exists.

There can be several roles for network slice templates (NSTs) during the lifecycle of an NSI. The NST is a set of global attributes. The NST can be used as a blueprint and be filled in with information to create a network slice instance. There can be different types of NSTs with different fields for attributes.

Figure 11:
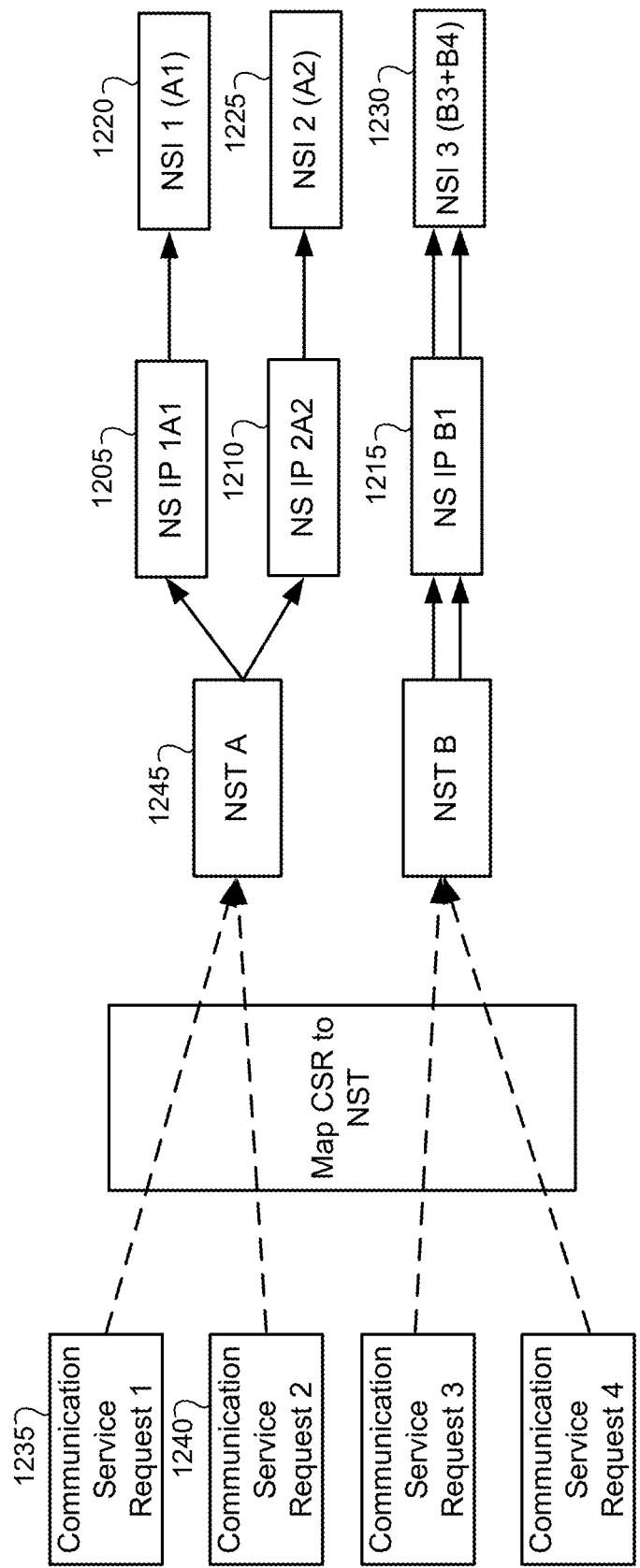
FIG. 11 is a block diagram illustrating a progression from receipt of a Communication Service Request to the creation of a network slice instance.

As shown in FIG. 11, slice specific information can be carried by a network slice instance profile (NSIP), which contains all necessary information to create the network slice instance, including a unique NSI ID. Therefore, the mapping between NSIP 1205, 1210, 1215 to NSI 1220, 1225, 1230 is 1-to-1. The Communication Service Request-1 1235 (CSR) and CSR-2 1240 can be mapped to an NST of type A 1245. The type of NST to be chosen can be determined by one of the CSMF and NSMF, or it may be provided by the customer. Based on Service Request Preparation operations at least one of the CSMF and NSMF can determine that CSR-1 and CSR-2 require two different slices (or slice instances). Using NST A 1245 as a blueprint two NSIPs can be created (1205, 1210). The information required to create these slices (or slice instances) and unique slice IDs can be filled in to the NSIPs. The preparation phase for the NSI can then be completed.

Figure 12:
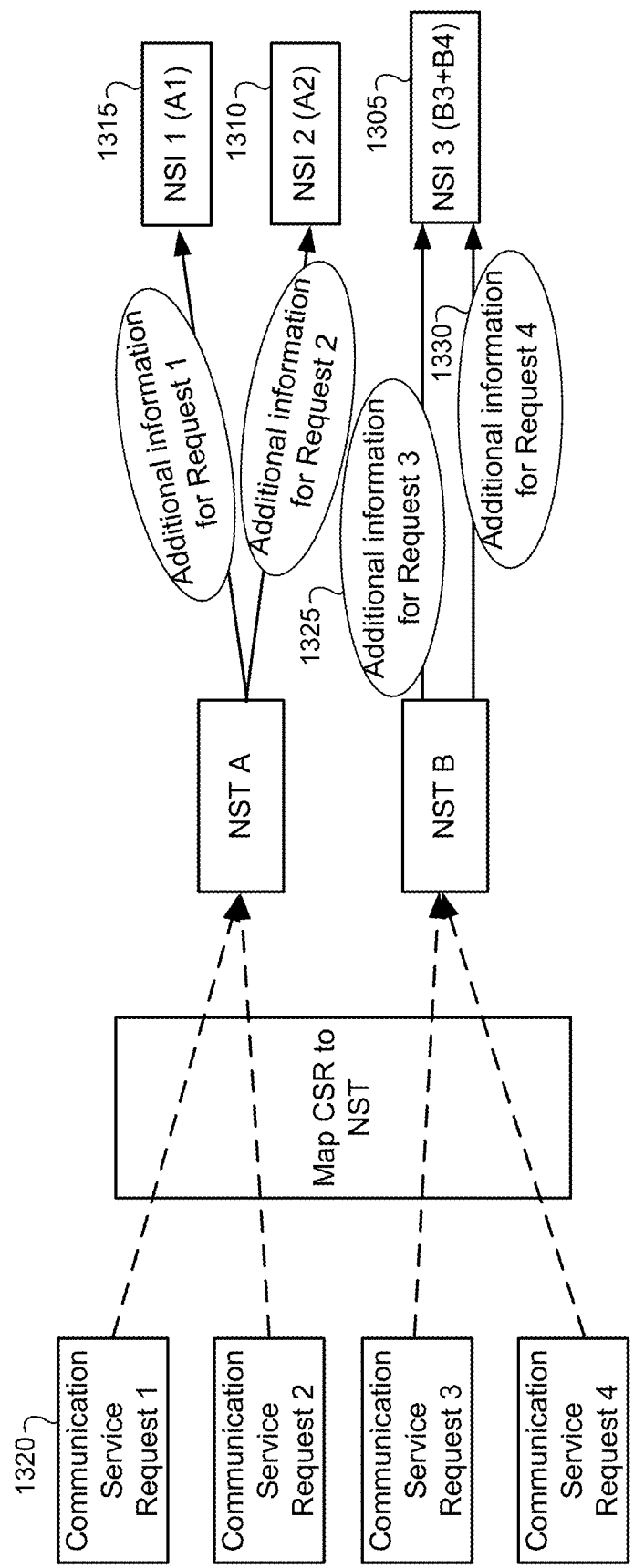
FIG. 12 is a block diagram illustrating a progression from receipt of a Communication Service Request to the creation of a network slice instance.

In an alternate embodiment, an NSIP may consist of a unique slice ID. A communication service request can be mapped to a matching NST. A NST can be used to create multiple NSIs by serving as a blueprint by adding NSI specific information to the NST. In FIG. 12, NST A is the template used for both NSI 1 1315 and NSI 2 1310.

A communication service instance (CSI) could also be realized by a single NSI or multiple NSIs. In addition, multiple communication service instances can be realized by a single shared NSI. In FIG. 12, communication request 1 1320 is served by a single NSI, i.e. NSI 1. Both the communication service requests 3, and 4 are served by NSI 3 1305.

Figure 13:
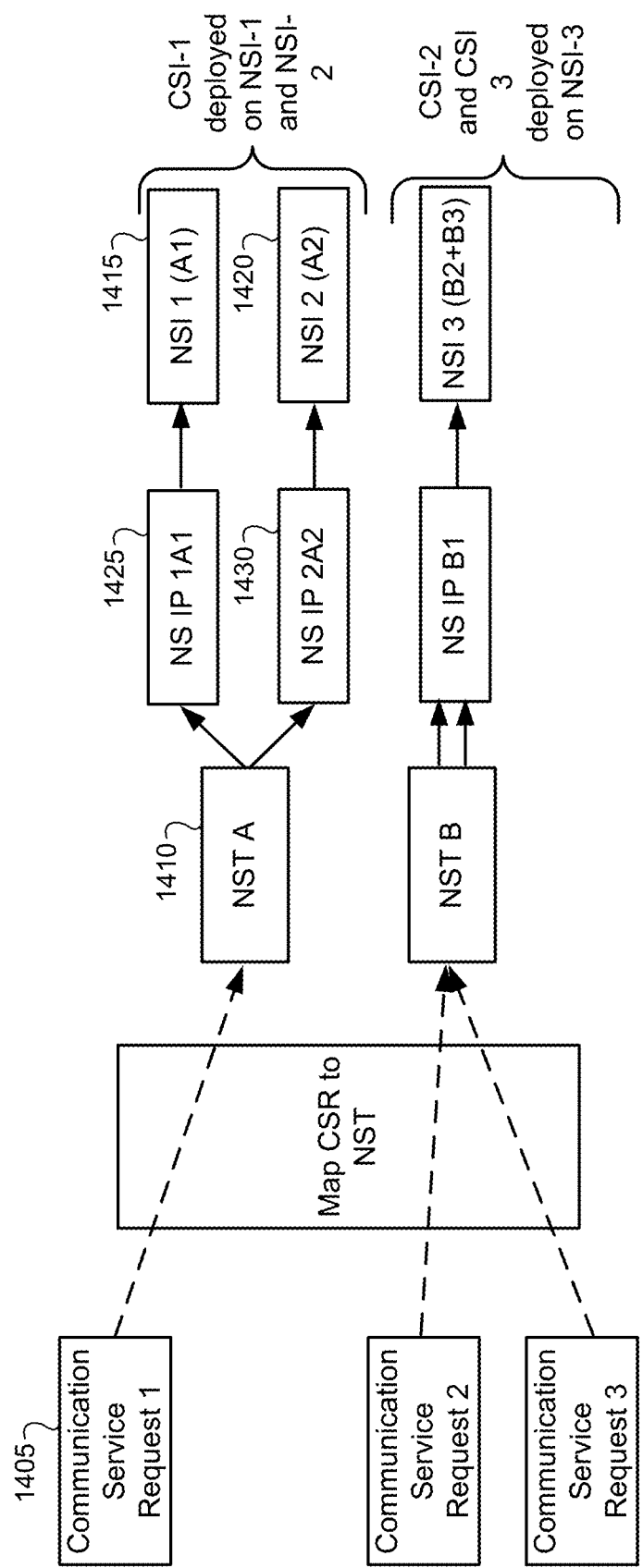
FIG. 13 is a block diagram illustrating a progression from a receipt of a Communication Service Request to the creation of a network slice instance.

In some other situations (as illustrated in FIG. 13), a CSI can be deployed on multiple NSIs. For instance, CSR-1 1405 is mapped to NST-A 1410. Then, the CSI-1 is deployed on NSI-1 1415 and NSI-2 1420. Note that, NSI-1 and NSI-2 have unique NSIPs (1425 and 1430 respectively).

It should be appreciated that the NSI 1 1415 and NSI 2 1420 may be newly provisioned NSIs or existing NSIs or a combination of newly provisioned and existing NSIs.

It will be understood that in some embodiments, the entity effecting the transitions between states of an NSI, may be an orchestration management entity, or in some embodiments may be a network controller such as a software defined networking controller.

Network management entities carrying out or controlling the methods described above may be resident within a management plane of a communications network. These entities may interact with control plane entities (and possibly user/data plane entities) within the network slices instances that are created and discussed. These network management entities may provide methods and functions for the utilization of slice templates and slice instance profiles to satisfy or address (wholly or in part) communication service requests. These communication service requests may be received from a customer of a service provider. Addressing the communication service requests may include taking into account aspects of the lifecycle management of communication service instances and network slices instances.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

We claim:

1. A system comprising:
a first network element and a second network element;
the first network element comprising:
   a network interface;
   a processor; and
   a non-transitory memory storing instructions that when executed by the processor cause to the first network element to implement a network slice management function (NSMF) responsible for the operation of a network slice instance (NSI) to which a first communication service instance (CSI) is deployed and a second network element, the NSMF configured to:
   receive an indication of a triggering event relating to an additional CSI;
   modify the NSI in response to the received triggering event such that NSI supports both the first CSI and the additional CSI, the NSI modification including logical topology modification and physical topology modification;
   receive an indication of a first triggering event relating to one of:
      terminating the first CSI; and
      terminating the additional CSI; and
   modify the NSI in response to receiving the indication of the first triggering event such that modifying the NSI includes changing the capability; changing the capability includes changing operation policies; and
the second network element is configured to send the indication to the NSMF.

2. The system of claim 1 wherein the NSMF is further configured to implement an NSI lifecycle including:
   a provisioning stage, the provisioning stage including forwarding traffic to the NSI;
   a run-time stage; and
   a decommissioning stage, the decommissioning stage including a deactivation stage and a termination stage.

3. The system of claim 2 wherein the NSMF is configured to modify the NSI such that modifying the NSI includes changing capacity.

4. The system of claim 2 wherein the NSMF is configured to modify the NSI such that modifying the NSI causes modification of at least one of:
   the first CSI; and
   the additional CSI and
   the NSI modification overlaps with the modification of at least one of the first CSI and the additional CSI.

5. The system of claim 2 wherein the NSMF is configured to modify the NSI such that NSI modification is triggered by a modification of at least one of:
   the first CSI; and
   the additional CSI and
   the NSI modification overlaps with the modification of at least one of the first CSI and the additional CSI.

6. The system of claim 2 wherein the NSMF is configured to deploy any one of:
   the first CSI to a plurality of NSIs; and
   the additional CSI to a plurality of NSIs and the plurality of NSIs is one of:
   newly created; and
   existing.

7. A system comprising:
a first network element and a second network element;
the first network element comprising:
   a network interface;
   a processor; and
   a non-transitory memory storing instructions that when executed by the processor cause to the first network element to implement a network slice management function (NSMF) responsible for the operation of a network slice instance (NSI) to which a first communication service instance (CSI) is deployed and a second network element, the NSMF configured to:
   receive an indication of a triggering event relating to an additional CSI;
   modify the NSI in response to the received triggering event such that NSI supports both the first CSI and the additional CSI, the NSI modification including logical topology modification and physical topology modification;
   receive an indication of a first triggering event relating to one of:
      terminating the first CSI; and
      terminating the additional CSI; and
   modify the NSI in response to receiving the indication of the first triggering event;
   receive an additional indication of an additional triggering event terminating the other of the first CSI and the additional CSI; and
   deactivate the NSI without releasing all network resources previously allocated to the NSI so as to maintain the NSI in an inactive state for future use in response to receiving the additional indication of the additional triggering event; the additional triggering event including a trigger to reactive the NSI using at least some of the network resources previously allocated to the NSI; and
the second network element is configured to send the indication to the NSMF.

8. The system of claim 7 wherein the NSMF is further configured to implement an NSI lifecycle including:
   a provisioning stage;
   a run-time stage, including a modification stage, an activation stage and a deactivation stage; and
   a decommissioning stage, including a termination stage;
   wherein deactivating the NSI without releasing all network resources previously allocated to the NSI so as to maintain the NSI in an inactive state for future use includes monitoring for further trigger events for one of:
      reactivating the NSI; and
      modifying the NSI based on service updates.

9. The system of claim 8 wherein the NSMF is configured to modify the NSI such that NSI modification is triggered by a modification of at least one of:
   the first CSI; and
   the additional CSI.

10. The system of claim 8 wherein the NSMF is configured to deploy any one of:
   the first CSI to a plurality of NSIs; and
   the additional CSI to a plurality of NSIs.

* * * * *